(12) United States Patent
Kishimoto

(10) Patent No.: US 11,233,227 B2
(45) Date of Patent: Jan. 25, 2022

(54) MANUFACTURING METHOD OF BELT-SHAPED ELECTRODE PLATE, MANUFACTURING METHOD OF CELL, AND ELECTRODE PLATE MANUFACTURING APPARATUS

(71) Applicant: TOYOTA JIDOSHA KABUSHIKI KAISHA, Toyota (JP)

(72) Inventor: Naoya Kishimoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/456,483

(22) Filed: Jun. 28, 2019

(65) Prior Publication Data
US 2020/0083517 A1    Mar. 12, 2020

(30) Foreign Application Priority Data

Sep. 11, 2018  (JP) .............................. JP2018-170068

(51) Int. Cl.
*H01M 4/04*     (2006.01)
*H01M 4/139*    (2010.01)
*H01M 10/0587*  (2010.01)
*H01M 4/02*     (2006.01)

(52) U.S. Cl.
CPC ....... *H01M 4/0404* (2013.01); *H01M 4/0471* (2013.01); *H01M 4/139* (2013.01); *H01M 10/0587* (2013.01); *H01M 4/0435* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2004/0131945 | A1* | 7/2004 | Zushi | H01M 10/0565 429/316 |
| 2005/0236732 | A1* | 10/2005 | Brosch | B29C 43/22 264/210.2 |
| 2013/0004814 | A1* | 1/2013 | Ohashi | H01M 10/0525 429/94 |
| 2013/0295377 | A1* | 11/2013 | Manabe | B29C 55/143 428/336 |

(Continued)

FOREIGN PATENT DOCUMENTS

| | | | | |
|---|---|---|---|---|
| EP | 1487038 | * 12/2004 | | H01M 4/48 |
| JP | 11-102696 A | 4/1999 | | |
| JP | 2011-023129 A | 2/2011 | | |

*Primary Examiner* — Jonathan Crepeau
*Assistant Examiner* — Angela J Martin
(74) *Attorney, Agent, or Firm* — Sughrue Mion, PLLC

(57) ABSTRACT

A manufacturing method of a belt-shaped electrode plate includes: forming an active material layer by drying a wet active material layer by heating in a drying furnace; and bringing n pieces of cooling rolls or the like into contact with the belt-shaped electrode plate carried out from the drying furnace, so as to cool down the belt-shaped electrode plate by the cooling rolls or the like while the belt-shaped electrode plate is bent in the thickness direction and conveyed in the longitudinal direction by the cooling rolls or the like. The n pieces of cooling rolls or the like are disposed such that a contact length is shorter as a temperature difference of the belt-shaped electrode plate is larger.

14 Claims, 11 Drawing Sheets

(56) References Cited

U.S. PATENT DOCUMENTS

| | | | |
|---|---|---|---|
| 2016/0155995 A1* | 6/2016 | Takahata | H01M 10/0525 |
| | | | 429/94 |
| 2018/0006292 A1* | 1/2018 | Nakano | H01M 4/661 |
| 2018/0221908 A1* | 8/2018 | Enokihara | B05C 1/0882 |
| 2021/0005863 A1* | 1/2021 | Nakazawa | H01M 10/0525 |

* cited by examiner

COMPARATIVE EXAMPLE

COMPARATIVE EXAMPLE

COMPARATIVE EXAMPLE

MANUFACTURING METHOD OF BELT-SHAPED ELECTRODE PLATE, MANUFACTURING METHOD OF CELL, AND ELECTRODE PLATE MANUFACTURING APPARATUS

INCORPORATION BY REFERENCE

The disclosure of Japanese Patent Application No. 2018-170068 filed on Sep. 11, 2018 including the specification, drawings and abstract is incorporated herein by reference in its entirety.

BACKGROUND

1. Technical Field

The disclosure relates to a manufacturing method of a belt-shaped electrode plate including a belt-shaped current collector foil and an active material layer formed into a belt shape on the current collector foil, a manufacturing method of a cell including the belt-shaped electrode plate, and an electrode plate manufacturing apparatus for manufacturing a belt-shaped electrode plate.

2. Description of Related Art

A belt-shaped electrode plate in which an active material layer is formed on a belt-shaped current collector foil is known as an electrode plate used for a lithium-ion secondary battery or the like. Such a belt-shaped electrode plate is manufactured by the following technique, for example. That is, first, while a belt-shaped current collector foil is conveyed in its longitudinal direction, an active material paste including active material particles, a solvent, and the like is applied to the current collector foil, so that a wet active material layer is formed into a belt shape on the current collector foil. Subsequently, while this wet electrode plate is conveyed in the longitudinal direction, the wet active material layer is dried by heating in a drying furnace, so that an active material layer is formed. After that, the belt-shaped electrode plate after the drying is wound off by a wind-up roll once. Further, roll press is performed on the belt-shaped electrode plate, so that the active material layer is pressed and consolidated in its thickness direction. Thus, the belt-shaped electrode plate is formed.

In the meantime, in a manufacturing process of the belt-shaped electrode plate, wrinkles may be formed in the belt-shaped electrode plate carried out from the drying furnace. For example, the problem that wrinkles are formed is pointed out in Japanese Unexamined Patent Application Publication No. 11-102696 (JP 11-102696 A). In order to solve this problem, in JP 11-102696 A, a guide roll and a guide roll cooler configured to cool down the guide roll are provided near an outlet of a drying furnace, and a belt-shaped electrode plate carried out from the drying furnace is brought into contact with the cooled guide roll, so that the belt-shaped electrode plate is cooled down (see claim 3, FIG. 1, etc., of JP 11-102696 A). JP 11-102696 A describes that this can effectively prevent wrinkles from being formed on the belt-shaped electrode plate (see paragraphs (0035), (0041), (0046), etc., in JP 11-102696 A).

SUMMARY

However, as a result of verification by the present inventors, it is found that the technique of JP 11-102696 A cannot appropriately prevent wrinkles from being formed in the belt-shaped electrode plate carried out from the drying furnace. More specifically, when the temperature of the guide roll provided near the outlet of the drying furnace is too low, the temperature of the belt-shaped electrode plate suddenly decreases at the time when the belt-shaped electrode plate passes through the guide roll, so that wrinkles are formed in the belt-shaped electrode plate.

In the meantime, when the temperature of the guide roll provided near the outlet of the drying furnace is increased to such an extent that no wrinkles are formed in the belt-shaped electrode plate, the temperature of the belt-shaped electrode plate after the belt-shaped electrode plate has passed through the guide roll is still high. On this account, it is necessary to lengthen the distance from the guide roll to a wind-up roll so as to cool down the belt-shaped electrode plate naturally, thereby resulting in that the electrode plate manufacturing apparatus is elongated. Further, when the distance from the guide roll to the wind-up roll is long, the belt-shaped electrode plate greatly bends downward between the guide roll and the wind-up roll. Accordingly, at the time when the belt-shaped electrode plate is wound off by the wind-up roll, wrinkles are formed in the belt-shaped electrode plate due to the bending.

Note that, in a case where the guide roll and the guide roll cooler are placed so as to be distanced from the outlet of the drying furnace, the belt-shaped electrode plate greatly bends downward between the outlet of the drying furnace and the guide roll. Accordingly, when the belt-shaped electrode plate makes contact with the guide roll, wrinkles are formed in the belt-shaped electrode plate due to the bending. As such, only by providing one guide roll (cooling roll) in the downstream from the drying furnace, wrinkles cannot be prevented appropriately from being formed in the belt-shaped electrode plate carried out from the drying furnace in some cases.

The disclosure provides a manufacturing method of a belt-shaped electrode plate in which wrinkles can be prevented from being formed in a belt-shaped electrode plate carried out from a drying furnace in a manufacturing process of the belt-shaped electrode plate, a manufacturing method of a cell in which wrinkles can be prevented from being formed in a belt-shaped electrode plate carried out from a drying furnace in a manufacturing process of the belt-shaped electrode plate, and an electrode plate manufacturing apparatus for manufacturing a belt-shaped electrode plate by preventing wrinkles from being formed in the belt-shaped electrode plate carried out from a drying furnace.

A first aspect of the disclosure relates to a manufacturing method of a belt-shaped electrode plate including a belt-shaped current collector foil and an active material layer formed on the current collector foil into a belt shape extending in the longitudinal direction of the current collector foil. The manufacturing method includes: forming the active material layer by conveying, in the longitudinal direction, a wet electrode plate in which a wet active material layer is formed on the current collector foil into a belt shape extending in the longitudinal direction, and drying the wet active material layer by heating in a drying furnace; and bringing n pieces of cooling rolls into contact with the belt-shaped electrode plate carried out from the drying furnace, so as to cool down the belt-shaped electrode plate by the cooling rolls while the belt-shaped electrode plate is bent in a thickness direction and conveyed in the longitudinal direction by the cooling rolls. Here, n is a natural number of 2 or more. The n pieces of cooling rolls are disposed such that a contact length $L(y)$ is shorter as a temperature difference ΔTd(y) is larger, where: (i) L(y) indicates a contact length, in the longitudinal direction, between the belt-shaped electrode plate and a y-th cooling roll configured to make contact with the belt-shaped electrode plate such that the y-th cooling roll is Y-th in an order of making contact with the belt-shaped electrode plate among the n pieces of cooling rolls; and (ii) ΔTd(1) indicates a temperature difference between a temperature Td(0) of the belt-shaped electrode plate at an outlet of the drying furnace and a temperature Td(1) of the belt-shaped electrode plate after the belt-shaped electrode plate has made contact with a first cooling roll, and ΔTd(y) indicates a temperature difference between a temperature Td(y−1) of the belt-shaped electrode plate after the belt-shaped electrode plate has made contact with a (y−1)th cooling roll and a temperature Td(y) of the belt-shaped electrode plate after the belt-shaped electrode plate has made contact with the y-th cooling roll.

As described above, only by providing one cooling roll in the downstream from the drying furnace, wrinkles cannot be prevented appropriately from being formed in the belt-shaped electrode plate. In view of this, the inventors considered to provide a plurality of cooling rolls in the downstream from the drying furnace and to cool down a belt-shaped electrode plate while the belt-shaped electrode plate is conveyed by the cooling rolls. In a case where the cooling rolls are arranged in a conveying path in such a form that the belt-shaped electrode plate is supported by the cooling rolls from the lower side (in a form where the cooling rolls make point contact with the belt-shaped electrode plate), wrinkles can be prevented from being formed in the belt-shaped electrode plate. However, the cooling rolls rub against the belt-shaped electrode plate, so that metal powder is caused (in a case where the cooling rolls rub against a current collector foil of the belt-shaped electrode plate) or powder of an active material is caused (in a case where the cooling rolls rub against an active material layer of the belt-shaped electrode plate). From this point, in order to restrain the metal powder or the powder of the active material from being caused during conveyance, it is preferable that the belt-shaped electrode plate be bent in the thickness direction and conveyed by the cooling rolls, so as to restrain friction between the cooling rolls and the belt-shaped electrode plate. However, it is found that, in a case where the contact length L(y), in the longitudinal direction, between the cooling roll and the belt-shaped electrode plate is longer as the temperature difference ΔTd(y) of the belt-shaped electrode plate is larger, wrinkles are easily formed in the belt-shaped electrode plate by the cooling roll, and hereby, the disclosure is accomplished.

In the manufacturing method of the belt-shaped electrode plate, in a cooling step, the belt-shaped electrode plate is cooled down while the belt-shaped electrode plate is bent in the thickness direction and conveyed in the longitudinal direction by the cooling rolls. At this time, the cooling rolls are disposed such that the y-th cooling roll and the belt-shaped electrode plate have such a relationship that the contact length L(y), in the longitudinal direction, between the y-th cooling roll and the belt-shaped electrode plate is shorter as the temperature difference ΔTd(y) of the belt-shaped electrode plate is larger.

By use of the cooling rolls, the belt-shaped electrode plate can be cooled down stepwise, so that it is possible to prevent such a situation that the temperature of the belt-shaped electrode plate suddenly decreases and wrinkles are formed in the belt-shaped electrode plate. Further, by use of the cooling rolls, it is possible to prevent such a situation that the belt-shaped electrode plate greatly bends downward during conveyance and wrinkles are formed in the belt-shaped electrode plate. Further, when the belt-shaped electrode plate is bent in the thickness direction and conveyed by the cooling rolls, it is possible to restrain metal powder or powder of the active material from being caused due to friction between the cooling rolls and the belt-shaped electrode plate, in comparison with a case where the cooling rolls make point contact with the belt-shaped electrode plate. Further, when the cooling rolls are disposed such that the y-th cooling roll and the belt-shaped electrode plate have such a relationship that the contact length L(y) between the cooling roll and the belt-shaped electrode plate is shorter as the temperature difference ΔTd(y) of the belt-shaped electrode plate is larger, it is also possible to prevent wrinkles from being formed in the belt-shaped electrode plate due to the contact length L(y). As such, the manufacturing method of the belt-shaped electrode plate can prevent wrinkles from being formed in the belt-shaped electrode plate carried out from the drying furnace in a manufacturing process of the belt-shaped electrode plate.

Note that examples of the "belt-shaped electrode plate" include a belt-shaped positive plate having a positive-electrode active material layer on one surface or both surfaces, a belt-shaped negative plate having a negative-electrode active material layer on one surface or both surfaces, and a composite electrode plate having a positive-electrode active material layer on a first surface and a negative-electrode active material layer on a second surface.

Further, the n pieces of cooling rolls may satisfy a condition of $Tr(1) > \ldots > Tr(n)$, where $Tr(y)$ indicates a temperature of a roll surface of the y-th cooling roll.

Since the condition of $Tr(1) > \ldots > Tr(n)$ is satisfied in terms of the temperature $Tr(y)$ of the roll surface of the y-th cooling roll, it is possible to prevent the temperature of the belt-shaped electrode plate from suddenly decreasing and to easily decrease the temperature of the belt-shaped electrode plate stepwise. Accordingly, it is possible to more surely prevent wrinkles from being formed in the belt-shaped electrode plate. Note that, in order to maintain the temperature Tr of the roll surface of the cooling roll, it is possible to use radiant heat from the drying furnace. Further, a temperature regulator such as a heater or a cooler may be provided and used.

At least one of the n pieces of cooling rolls may use radiant heat from the drying furnace to maintain the temperature $Tr(y)$ of the roll surface.

Since at least one of the cooling rolls uses radiant heat from the drying furnace to maintain the roll surface at the temperature $Tr(y)$, it is possible to reduce such a necessity that a temperature regulator such as a heater is provided separately and used.

The temperature difference ΔTd(y) may be less than 35° C.

When the temperature difference ΔTd(y) of the belt-shaped electrode plate before and after the contact with the y-th cooling roll is too large, more specifically, when the temperature difference ΔTd(y) is 35° C. or more, wrinkles are easily formed in the belt-shaped electrode plate. On the other hand, in the manufacturing method of the belt-shaped electrode plate, the temperature difference ΔTd(y) of the belt-shaped electrode plate is less than 35° C., so that it is possible to more effectively prevent wrinkles from being formed in the belt-shaped electrode plate due to rapid cooling along with the contact with the cooling roll.

The number n of cooling rolls may be three or more.

By setting the number n of cooling rolls to three or more, it is possible to prevent the temperature of the belt-shaped electrode plate from suddenly decreasing and to easily decrease the temperature of the belt-shaped electrode plate stepwise, in comparison with a case where the number n of cooling rolls is n=2. Accordingly, in comparison with the case where the number n of cooling rolls is n=2, it is possible to more surely prevent wrinkles from being formed in the belt-shaped electrode plate.

The contact length L(y) may be 14 mm or more.

When the contact length L(y), in the longitudinal direction, between the cooling roll and the belt-shaped electrode plate is too short, more specifically, when the contact length L(y) is less than 14 mm, the cooling roll rubs against the belt-shaped electrode plate, so that metal powder or powder of the active material is easily caused. In contrast, in the manufacturing method of the belt-shaped electrode plate, the contact length L(y), in the longitudinal direction, between the cooling roll and the belt-shaped electrode plate is 14 mm or more, so that it is possible to more effectively restrain metal powder or powder of the active material from being caused due to friction between the cooling roll and the belt-shaped electrode plate.

Further, a second aspect of the disclosure relates to a manufacturing method of a cell including an electrode body provided with a belt-shaped electrode plate including a belt-shaped current collector foil and an active material layer formed on the current collector foil into a belt shape extending in the longitudinal direction of the current collector foil. The manufacturing method includes: manufacturing the belt-shaped electrode plate by any of the manufacturing methods described above; forming the electrode body including the belt-shaped electrode plate; and assembling the cell including the electrode body.

In the manufacturing method of the cell, the belt-shaped electrode plate is manufactured by the above manufacturing method of the belt-shaped electrode plate. Accordingly, it is possible to prevent wrinkles from being formed in the belt-shaped electrode plate carried out from the drying furnace. On this account, by forming the electrode body including the belt-shaped electrode plate without wrinkles (an electrode body forming step), and further, by assembling the cell including the electrode body (a cell assembly step), a reliable cell can be manufactured. Note that examples of the "electrode body" include a cylindrical or flat wound-type electrode body formed by use of the belt-shaped electrode plate while its belt shape is maintained, and a laminated-type electrode body formed by cutting the belt-shaped electrode plate into a predetermined shape such as a rectangular shape and using the electrode plate thus cut.

Further, a third aspect of the disclosure relates to an electrode plate manufacturing apparatus for manufacturing a belt-shaped electrode plate including a belt-shaped current collector foil and an active material layer formed on the current collector foil into a belt shape extending in the longitudinal direction of the current collector foil. The electrode plate manufacturing apparatus includes: a drying furnace configured to form the active material layer by conveying, in the longitudinal direction, a wet electrode plate in which a wet active material layer is formed on the current collector foil into a belt shape extending in the longitudinal direction, and drying the wet active material layer by heating; and n pieces of cooling rolls configured to cool down the belt-shaped electrode plate by making contact with the belt-shaped electrode plate carried out from the drying furnace and conveying the belt-shaped electrode plate in the longitudinal direction while the belt-shaped electrode plate is bent in a thickness direction. Here, n is a natural number of 2 or more. The n pieces of cooling rolls are disposed such that a contact length L(y) is shorter as a temperature difference $\Delta Td(y)$ is larger, where: L(y) indicates a contact length, in the longitudinal direction, between the belt-shaped electrode plate and a y-th cooling roll configured to make contact with the belt-shaped electrode plate such that the y-th cooling roll is Y-th in an order of making contact with the belt-shaped electrode plate among the n pieces of cooling rolls; and $\Delta Td(1)$ indicates a temperature difference between a temperature $Td(0)$ of the belt-shaped electrode plate at an outlet of the drying furnace and a temperature $Td(1)$ of the belt-shaped electrode plate after the belt-shaped electrode plate has made contact with a first cooling roll, and $\Delta Td(y)$ indicates a temperature difference between a temperature $Td(y-1)$ of the belt-shaped electrode plate after the belt-shaped electrode plate has made contact with a $(y-1)$th cooling roll and a temperature $Td(y)$ of the belt-shaped electrode plate after the belt-shaped electrode plate has made contact with the y-th cooling roll.

The electrode plate manufacturing apparatus includes the cooling rolls configured to cool down the belt-shaped electrode plate by bending, in the thickness direction, the belt-shaped electrode plate carried out from the drying furnace and conveying the belt-shaped electrode plate in the longitudinal direction. The cooling rolls are disposed such that the y-th cooling roll and the belt-shaped electrode plate have such a relationship that the contact length L(y), in the longitudinal direction, between the y-th cooling roll and the belt-shaped electrode plate is shorter as the temperature difference $\Delta Td(y)$ of the belt-shaped electrode plate is larger.

By use of the cooling rolls, the belt-shaped electrode plate can be cooled down stepwise, so that it is possible to prevent such a situation that the temperature of the belt-shaped electrode plate suddenly decreases and wrinkles are formed in the belt-shaped electrode plate. Further, by use of the cooling rolls, it is possible to prevent such a situation that the belt-shaped electrode plate greatly bends downward during conveyance and wrinkles are formed in the belt-shaped electrode plate. Further, when the belt-shaped electrode plate is bent in the thickness direction and conveyed by the cooling rolls, it is possible to restrain metal powder or powder of the active material from being caused due to friction between the cooling rolls and the belt-shaped electrode plate, in comparison with a case where the cooling rolls make point contact with the belt-shaped electrode plate. Further, when the cooling rolls are disposed such that the y-th cooling roll and the belt-shaped electrode plate have such a relationship that the contact length L(y) between the cooling roll and the belt-shaped electrode plate is shorter as the temperature difference $\Delta Td(y)$ of the belt-shaped electrode plate is larger, it is also possible to prevent wrinkles from being formed in the belt-shaped electrode plate due to the contact length L(y). Thus, in the electrode plate manufacturing device, it is possible to prevent wrinkles from being formed in the belt-shaped electrode plate carried out from the drying furnace.

The n pieces of cooling rolls may satisfy a condition of $Tr(1) > \ldots > Tr(n)$, where $Tr(y)$ indicates a temperature of a roll surface of the y-th cooling roll.

Since the condition of $Tr(1) > \ldots > Tr(n)$ is satisfied in terms of the temperature $Tr(y)$ of the roll surface of the y-th cooling roll, it is possible to prevent the temperature of the belt-shaped electrode plate from suddenly decreasing and to easily decrease the temperature of the belt-shaped electrode plate stepwise. Accordingly, it is possible to more surely prevent wrinkles from being formed in the belt-shaped electrode plate.

At least one of the n pieces of cooling rolls may be disposed at a position where the at least one of the n pieces of cooling roll receives radiant heat from the drying furnace to maintain the temperature Tr(y) of the roll surface.

Since at least one of the cooling rolls uses radiant heat from the drying furnace to maintain the roll surface at the temperature Tr(y), it is possible to reduce such a necessity that a temperature regulator such as a heater is provided separately and used.

The temperature difference $\Delta Td(y)$ may be less than 35° C.

Since the temperature difference $\Delta Td(y)$ of the belt-shaped electrode plate before and after the contact with the y-th cooling roll is less than 35° C., it is possible to more effectively prevent wrinkles from being formed in the belt-shaped electrode plate due to rapid cooling along with the contact with the cooling roll.

The number n of cooling rolls may be three or more.

By setting the number n of cooling rolls to three or more, it is possible to prevent the temperature of the belt-shaped electrode plate from suddenly decreasing and to easily decrease the temperature of the belt-shaped electrode plate stepwise, in comparison with a case where the number n of cooling rolls is n=2. Accordingly, in comparison with the case where the number n of cooling rolls is n=2, it is possible to more surely prevent wrinkles from being formed in the belt-shaped electrode plate.

The contact length L(y) may be 14 mm or more.

In the electrode plate manufacturing apparatus, the contact length L(y), in the longitudinal direction, between the cooling roll and the belt-shaped electrode plate is 14 mm or more, so that it is possible to more effectively restrain metal powder or powder of the active material from being caused due to friction between the cooling roll and the belt-shaped electrode plate.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
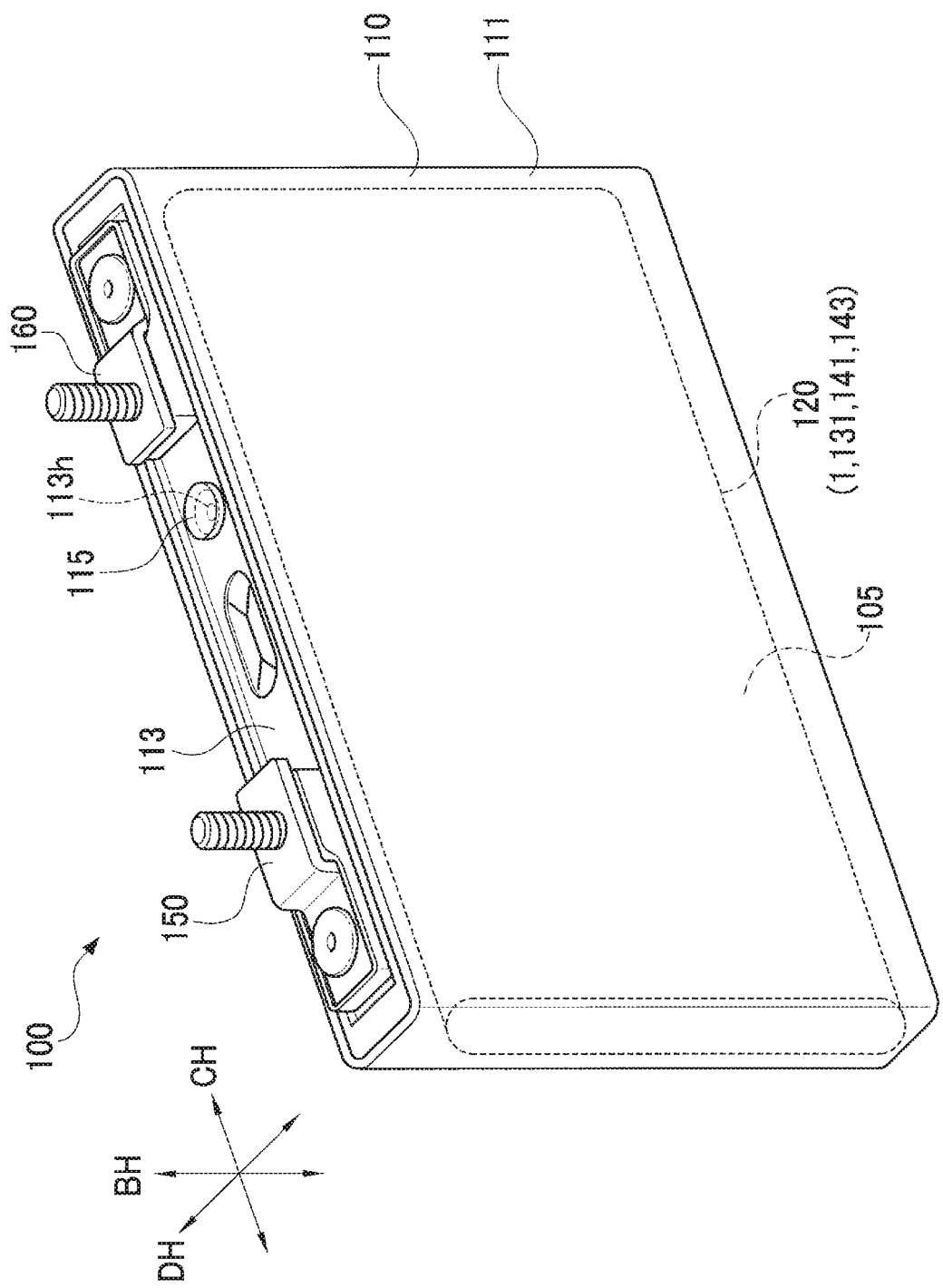
FIG. 1 is a perspective view of a cell according to an embodiment.
Figure 2:
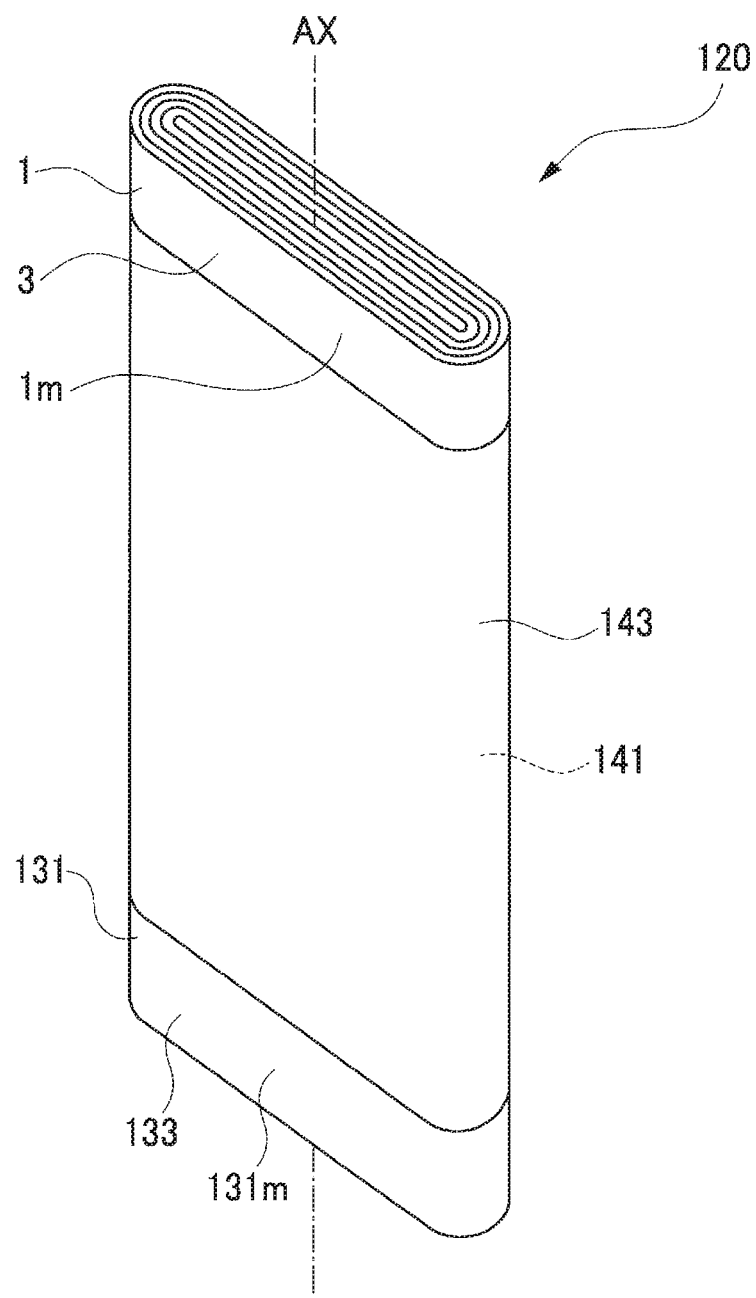
FIG. 2 is a perspective view of an electrode body according to the embodiment.
Figure 3:
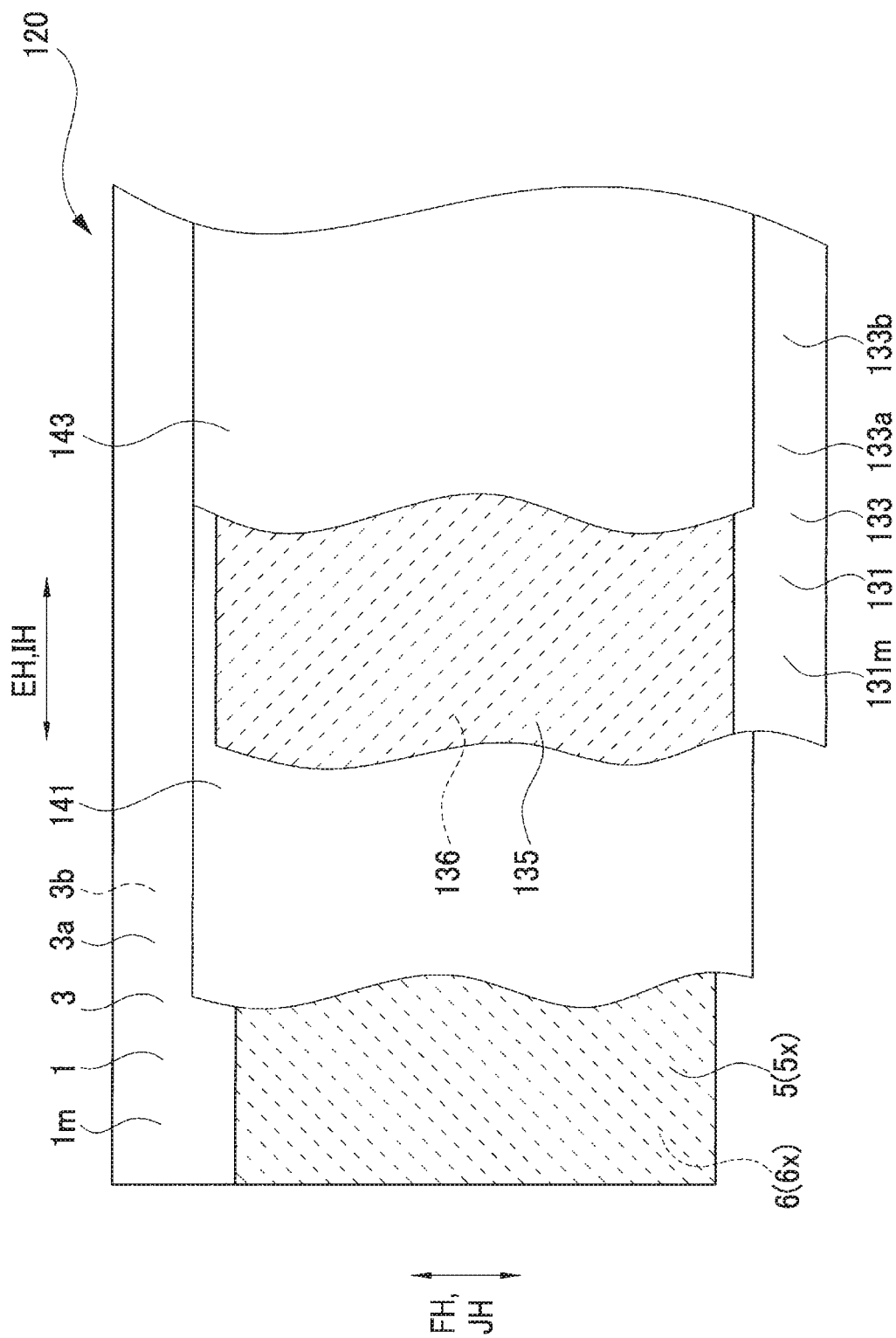
FIG. 3 is a developed view of the electrode body according to the embodiment.

Referring to the drawings, an embodiment of the disclosure will be described below. FIG. 1 is a perspective view of a cell 100 according to the present embodiment. Further, FIG. 2 is a perspective view of an electrode body 120 constituting the cell 100, and FIG. 3 is a developed view of the electrode body 120. Note that, in the following description, a vertical direction BH, a lateral direction CH, and a thickness direction DH of the cell 100 are defined as directions illustrated in FIG. 1. The cell 100 is an encapsulated-type lithium-ion secondary battery having a square shape and provided in a vehicle such as a hybrid car, a plug-in hybrid car, or an electric vehicle. The cell 100 is constituted by a square-shaped cell case 110, a flat wound-type electrode body 120 and an electrolytic solution 105 accommodated in the cell case 110, and a positive terminal member 150 and a negative terminal member 160 supported by the cell case 110, and so on (see FIG. 1).

Among them, the cell case 110 has a rectangular solid box shape and is made of metal (aluminum in the present embodiment). The cell case 110 is constituted by a case body member 111 having a bottomed squarely cylindrical shape only the upper side of which is opened, and a case cover member 113 having a rectangular plate shape and welded to close the opening of the case body member 111. The positive terminal member 150 made of aluminum is secured to the case cover member 113 in an insulated manner from the case cover member 113. The positive terminal member 150 is connected to a belt-shaped positive plate (a belt-shaped electrode plate) 1 (hereinafter also just referred to as the "positive plate 1") of the electrode body 120 (also see FIGS. 2 and 3) in a conductive manner inside the cell case 110, and the positive terminal member 150 extends to the outside of the cell so as to penetrate through the case cover member 113. Further, the negative terminal member 160 made of copper is secured to the case cover member 113 in an insulated manner from the case cover member 113. The negative terminal member 160 is connected to a belt-shaped negative plate 131 (hereinafter also just referred to as "negative plate 131") of the electrode body 120 in a conductive manner inside the cell case 110, and the negative terminal member 160 extends to the outside of the cell so as to penetrate through the case cover member 113.

Figure 4:
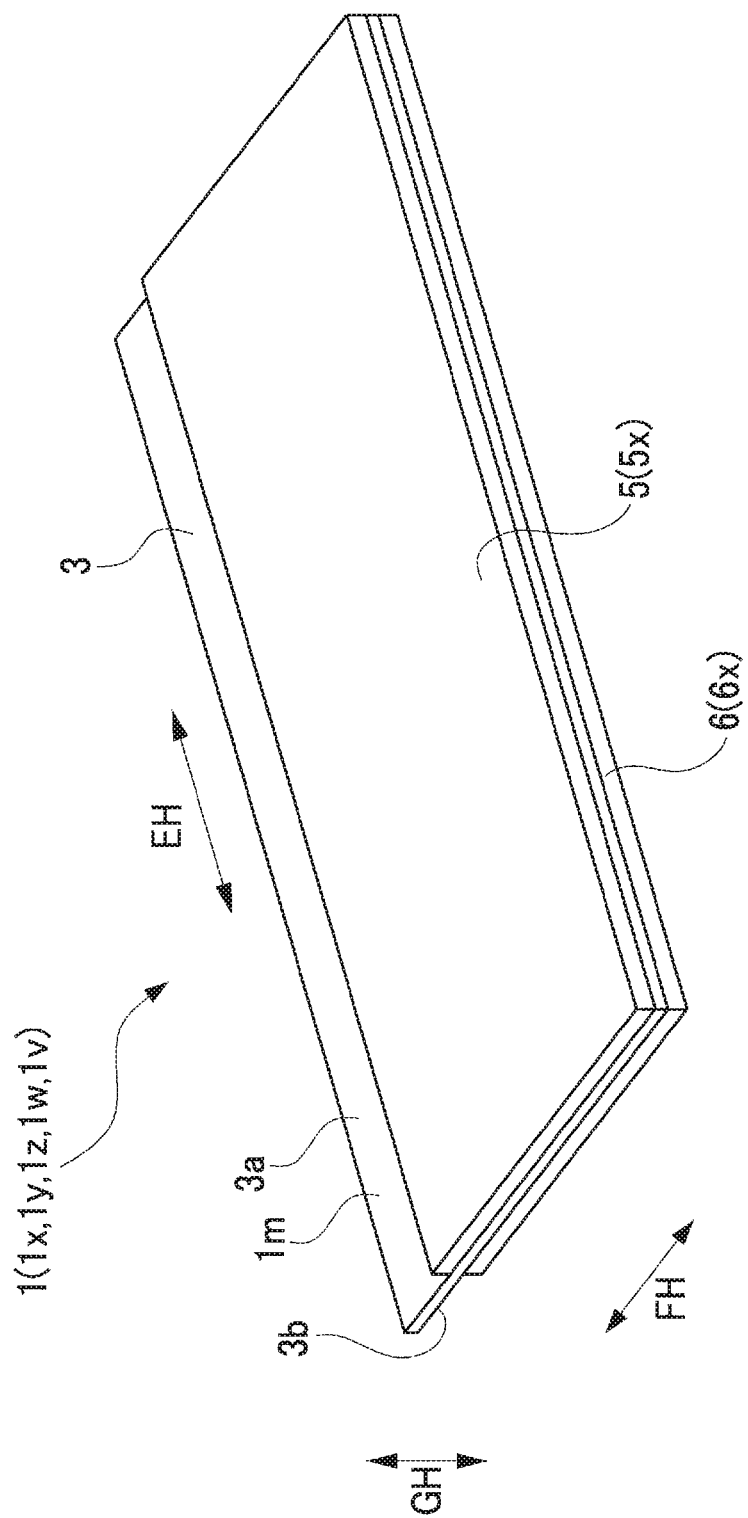
FIG. 4 is a perspective view of a belt-shaped positive plate according to the embodiment.
Figure 5:
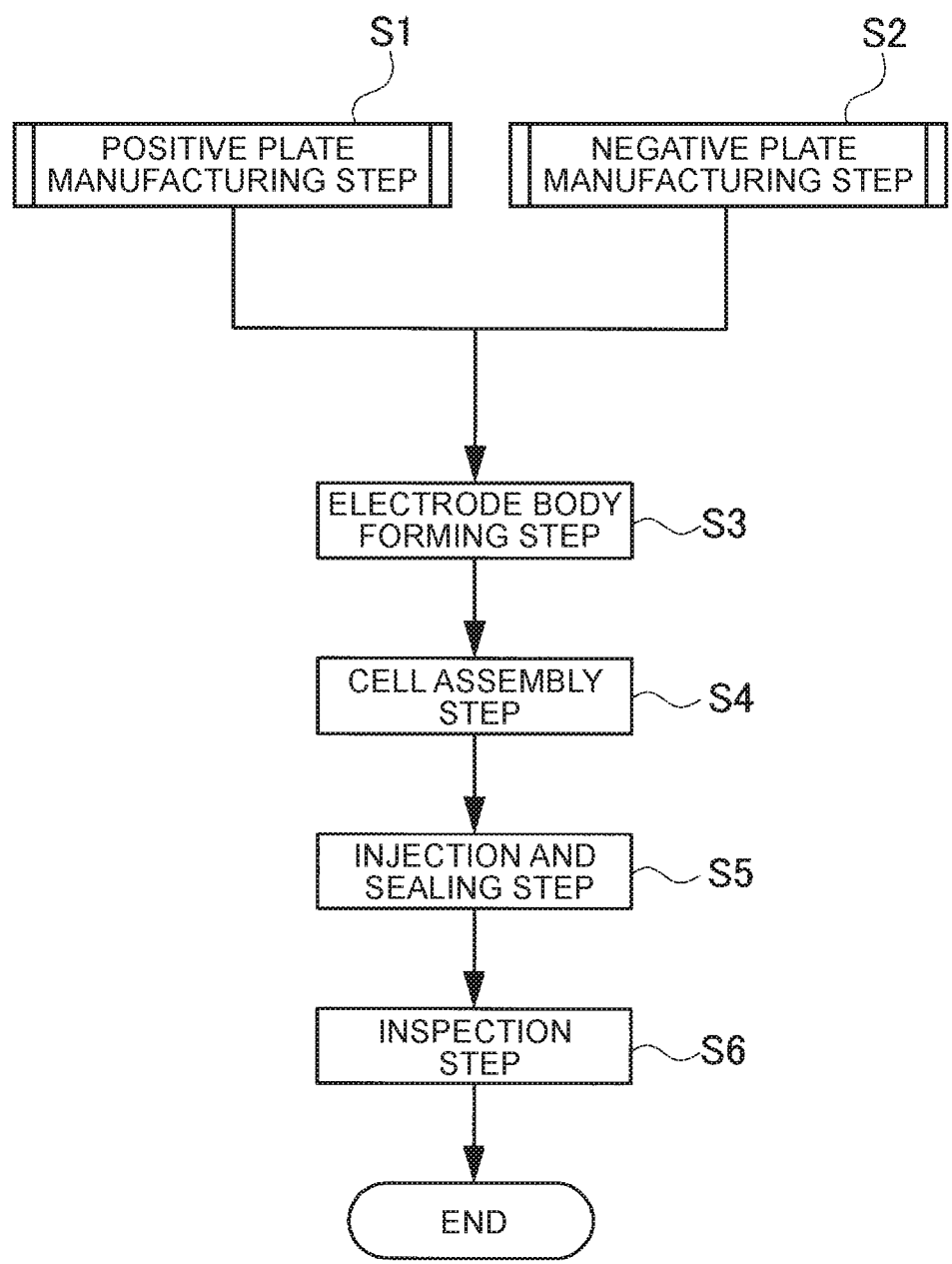
FIG. 5 is a flowchart of a manufacturing method of a cell according to the embodiment.
Figure 6:
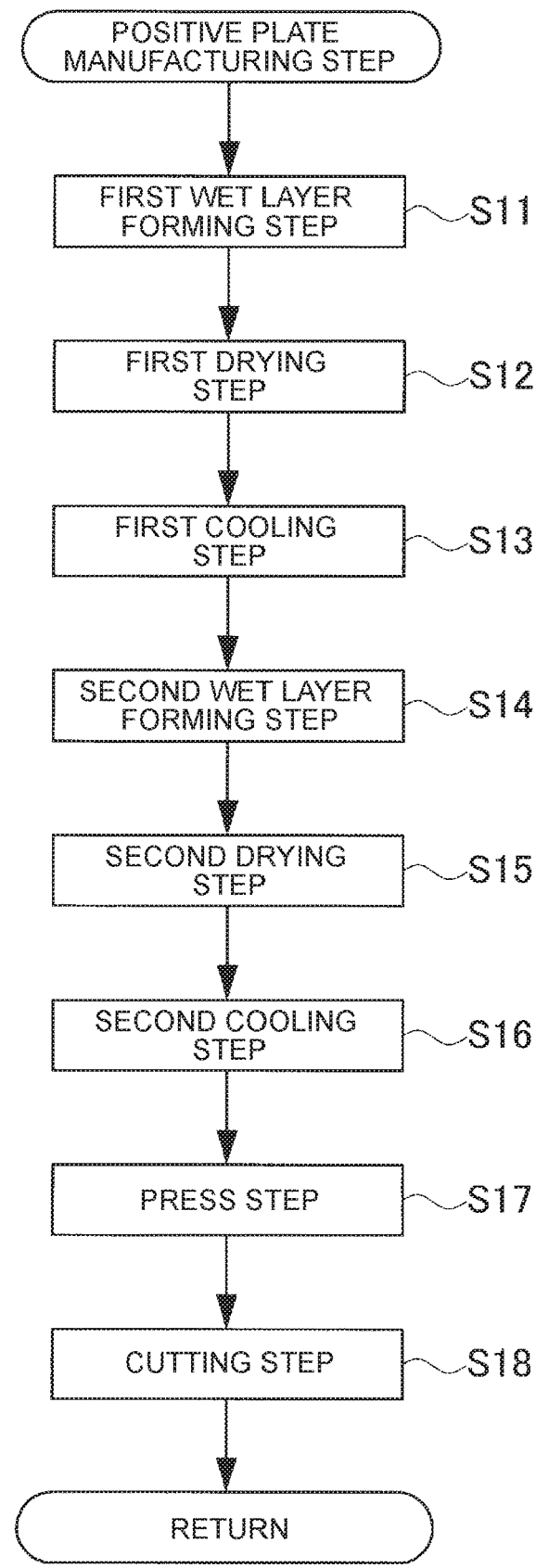
FIG. 6 is a flowchart of a sub-routine of a positive plate manufacturing step according to the embodiment.

The electrode body 120 (see FIGS. 1 to 3) has a flat shape and is accommodated in the cell case 110 in a state of lying sideways. The electrode body 120 is a flat wound-type electrode body configured such that the positive plate 1 and the negative plate 131 are laminated via a pair of belt-shaped separators 141, 143 and wounded around an axis AX in a flat manner. Among them, a perspective view of the positive plate 1 is illustrated in FIG. 4 separately. Note that, in the following description, a longitudinal direction EH, a width direction FH, and a thickness direction GH of the positive plate 1 and a positive-electrode current collector foil (a current collector foil) 3 constituting the positive plate 1 are defined as directions illustrated in FIG. 4.

The positive plate 1 includes the positive-electrode current collector foil 3 made of a belt-shaped aluminum foil extending in the longitudinal direction EH. A first positive-electrode active material layer (an active material layer) 5 is formed in a belt shape in the longitudinal direction EH on a first principal surface 3a of the positive-electrode current collector foil 3, except a first end portion in the width direction FH. Further, a second positive-electrode active material layer (an active material layer) 6 is formed in a belt shape in the longitudinal direction EH on a second principal surface 3b of the positive-electrode current collector foil 3 on the opposite side from the first principal surface 3a, except the first end portion in the width direction FH.

The first positive-electrode active material layer 5 and the second positive-electrode active material layer 6 are each made from positive-electrode active material particles, conductive particles, and a binder. In the present embodiment, as the positive-electrode active material particles, lithium transition metal compound oxide particles, more specifically, lithium nickel cobalt manganese oxide particles are used. Further, acetylene black (AB) particles are used as the conductive particles, and polyvinylidene fluoride (PVDF) is used as the binder. In the positive plate 1, the first end portion in the width direction FH has a belt shape extending in the longitudinal direction EH. The first end portion in the width direction does not include the first positive-electrode active material layer 5 and the second positive-electrode active material layer 6 in the thickness direction GH, so that the first end portion serves as a positive electrode exposed portion 1m where the positive-electrode current collector foil 3 is exposed. In a state where the cell 100 is assembled, the positive terminal member 150 is welded to the positive electrode exposed portion 1m.

Further, the negative plate 131 (see FIG. 3) includes a negative-electrode current collector foil 133 made of a belt-shaped copper foil extending in a longitudinal direction IH. A first negative-electrode active material layer 135 is formed in a belt shape in the longitudinal direction IH on a first principal surface 133a of the negative-electrode current collector foil 133, except a second end portion in a width direction JH. Further, a second negative-electrode active material layer 136 is formed in a belt shape in the longitudinal direction IH on a second principal surface 133b of the negative-electrode current collector foil 133 on the opposite side from the first principal surface 133a, except the second end portion in the width direction JH.

The first negative-electrode active material layer 135 and the second negative-electrode active material layer 136 are each made from negative-electrode active material particles, a binder, and a thickener. In the present embodiment, graphite particles are used as the negative-electrode active material particles, styrene butadiene rubber (SBR) is used as the binder, and carboxymethyl cellulose (CMC) is used as the thickener. In the negative plate 131, the second end portion in the width direction JH has a belt shape extending in the longitudinal direction IH. The second end portion in the width direction JH does not include the first negative-electrode active material layer 135 and the second negative-electrode active material layer 136 in the thickness direction, so that the second end portion serves as a negative electrode exposed portion 131m where the negative-electrode current collector foil 133 is exposed. In the state where the cell 100 is assembled, the negative terminal member 160 is welded to the negative electrode exposed portion 131m.

Next will be described a manufacturing method of the belt-shaped positive plate 1 and a manufacturing method of the cell 100 using the belt-shaped positive plate 1 (see FIGS. 5 to 8). First, in a "positive plate manufacturing step (an electrode plate manufacturing step) S1," the belt-shaped positive plate 1 is manufactured. That is, in a "first wet layer forming step S11" in the positive plate manufacturing step S1 (see FIG. 6), a wet first active material layer 5x is formed in a belt shape extending in the longitudinal direction EH, on the first principal surface 3a of the positive-electrode current collector foil 3. Note that a wet positive plate (a wet electrode plate) in which the wet first active material layer 5x is formed on the positive-electrode current collector foil 3 is referred to as a wet single-sided positive plate 1x.

Figure 7:
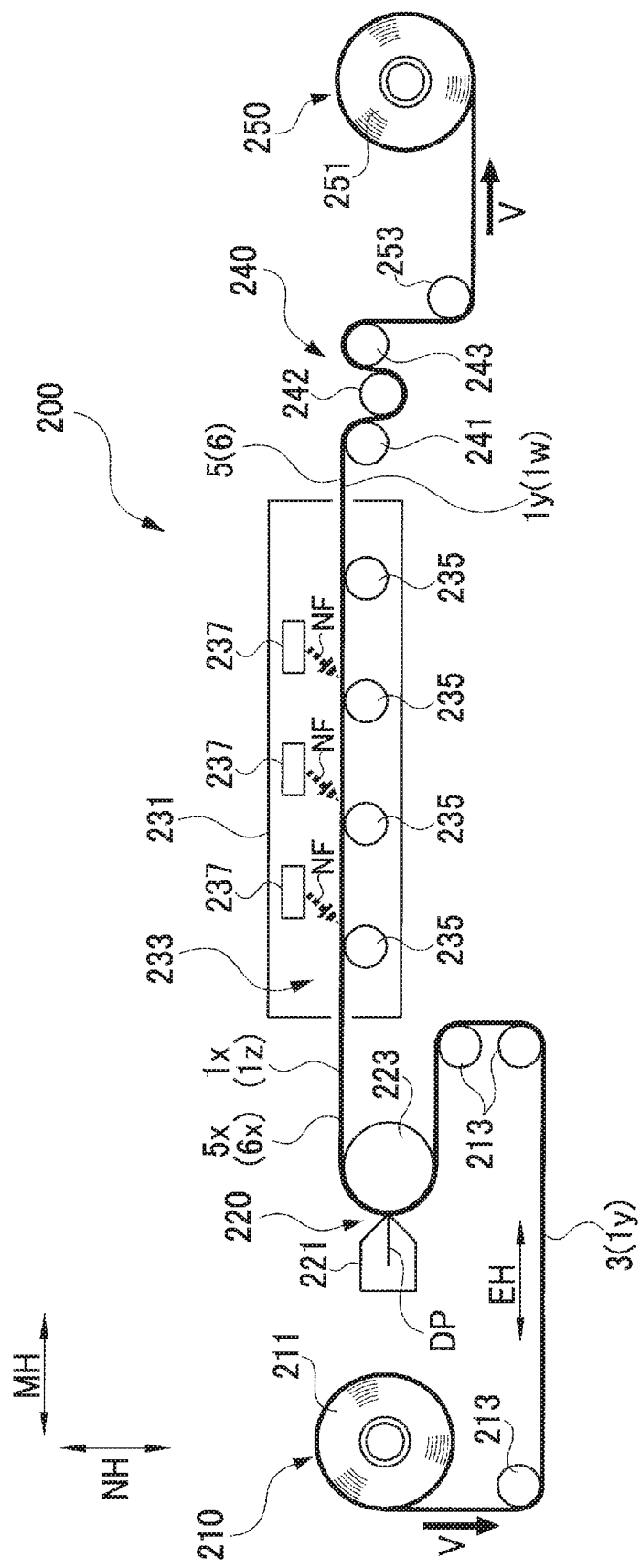
FIG. 7 is an explanatory view illustrating a state where the belt-shaped positive plate is formed by use of an electrode plate manufacturing apparatus according to the embodiment.

Note that, the first wet layer forming step S11 to a first cooling step S13 (described later) are performed continuously by use of an electrode plate manufacturing apparatus 200 illustrated in FIGS. 7 and 8. The following first describes the electrode plate manufacturing apparatus 200. Note that, in the following description, a lateral direction MH and a height direction NH of the electrode plate manufacturing apparatus 200 are defined as directions illustrated in FIGS. 7 and 8. The electrode plate manufacturing apparatus 200 includes: a supply portion 210 configured to supply the positive-electrode current collector foil 3 (or a single-sided positive plate 1y (described later)); a die coating portion 220 configured to perform die coating of a positive electrode paste DP on the positive-electrode current collector foil 3 (or the single-sided positive plate 1y); a drying furnace 230 configured to dry the wet first active material layer 5x (or a wet second active material layer 6x (described later)); a cooling portion 240 configured to cool down the single-sided positive plate 1y (or a double-sided positive plate 1w (described later)); and a wind-up and conveyance portion 250 configured to wind the single-sided positive plate 1y (or the double-sided positive plate 1w).

Among them, the supply portion 210 includes a feed roll 211 around which the belt-shaped positive-electrode current collector foil 3 (or the single-sided positive plate 1y) is wound, and a plurality of conveyance rolls 213 configured to convey the positive-electrode current collector foil 3 (or the single-sided positive plate 1y) in the longitudinal direction EH. The supply portion 210 is configured to convey the positive-electrode current collector foil 3 (or the single-sided positive plate 1y) to the die coating portion 220. Note that, in the present embodiment, a conveyance speed V of the positive-electrode current collector foil 3 or the like in the electrode plate manufacturing apparatus 200 is set to V=20 m/min.

The die coating portion 220 is constituted by an coating die 221 configured to discharge the positive electrode paste DP, a backup roll 223 configured to convey the positive-electrode current collector foil 3 (or the single-sided positive plate 1y), a pump (not shown) configured to emit the positive electrode paste DP to the coating die 221, and so on. The die coating portion 220 is configured to form the wet first active material layer 5x on the first principal surface 3a of the positive-electrode current collector foil 3 (or the wet second active material layer 6x on the second principal surface 3b of the positive-electrode current collector foil 3 of the single-sided positive plate 1y) by applying, from the coating die 221, the positive electrode paste DP to the first principal surface 3a of the positive-electrode current collector foil 3 (or to the second principal surface 3b of the positive-electrode current collector foil 3 of the single-sided positive plate 1y).

The drying furnace 230 includes a drying room 233 partitioned from its outside by a wall portion 231. Inside the drying room 233, a plurality of conveyance rolls 235 configured to convey the wet single-sided positive plate 1x (described later) (or a wet double-sided positive plate 1z) in the longitudinal direction EH is disposed. Further, inside the drying room 233, a plurality of hot air blowing portions 237 configured to blow hot air NF toward the wet first active material layer 5x of the wet single-sided positive plate 1x (or the wet second active material layer 6x of the wet double-sided positive plate 1z) is disposed. In the present embodiment, the temperature of the hot air NF is set to 180° C. Hereby, the wet first active material layer 5x of the wet single-sided positive plate 1x (or the wet second active material layer 6x of the wet double-sided positive plate 1z) carried into the drying furnace 230 can be dried.

Figure 8:
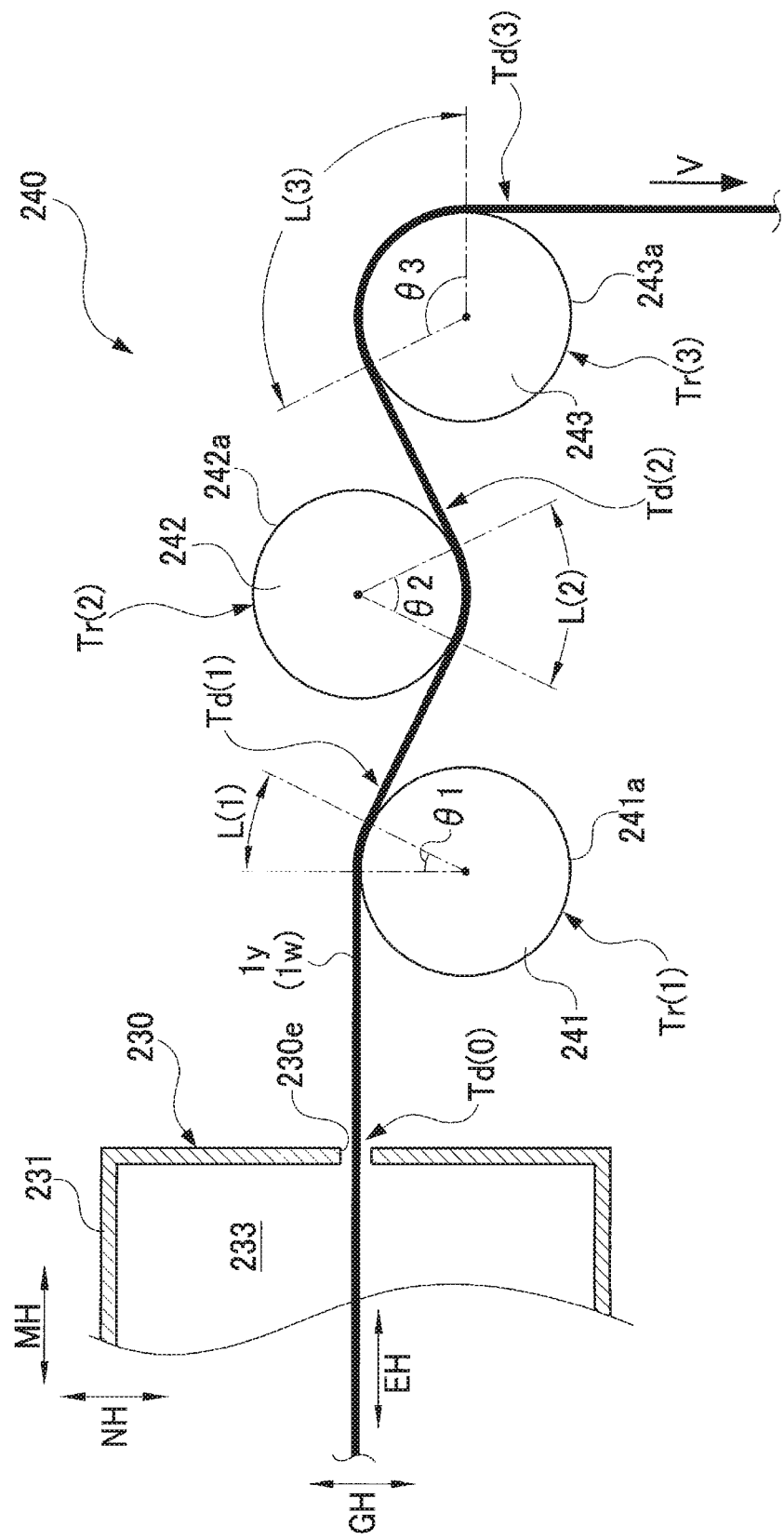
FIG. 8 is an explanatory view illustrating the vicinity of cooling rolls in the electrode plate manufacturing apparatus according to the embodiment.

The cooling portion 240 includes a plurality of cooling rolls (n=3, in the present embodiment) (a first cooling roll 241, a second cooling roll 242, and a third cooling roll 243) with an outside diameter of 80 mm (see FIG. 8). The cooling rolls 241, 242, 243 make contact with the single-sided positive plate 1y (or the double-sided positive plate 1w) carried out from an outlet 230e of the drying furnace 230 and cool down the single-sided positive plate 1y (or the double-sided positive plate 1w) while the cooling rolls 241, 242, 243 bend the single-sided positive plate 1y (or the double-sided positive plate 1w) in the thickness direction GH and convey the single-sided positive plate 1y (or the double-sided positive plate 1w) in the longitudinal direction EH. Among the three cooling rolls 241, 242, 243, a cooling roll that first makes contact with the single-sided positive plate 1y (or the double-sided positive plate 1w) is the first cooling roll 241, a cooling roll that secondly makes contact with the single-sided positive plate 1y (or the double-sided positive plate 1w) is the second cooling roll 242, and a cooling roll that thirdly (finally) makes contact with the single-sided positive plate 1y (or the double-sided positive plate 1w) is the third cooling roll 243. Further, a coolant may flow through the cooling rolls 241, 242, 243 so as to adjust surface temperatures of the cooling rolls 241, 242, 243.

The center of the first cooling roll 241 is disposed at a position distanced from the outlet 230e of the drying furnace 230 by 220 mm in the lateral direction MH. Further, the first cooling roll 241 is disposed below the single-sided positive plate 1y (or the double-sided positive plate 1w) in the height direction NH so that the single-sided positive plate 1y (or the double-sided positive plate 1w) carried out from the outlet 230e of the drying furnace 230 is conveyed along the lateral direction MH and the first cooling roll 241 makes contact with the single-sided positive plate 1y (or the double-sided positive plate 1w) from the lower side in the height direction NH. The first cooling roll 241 is placed near the drying furnace 230, so that the first cooling roll 241 is heated by radiant heat from the drying furnace 230. More specifically, a temperature Tr(1) of a roll surface 241a of the first cooling roll 241 is Tr(1)=50° C.

The center of the second cooling roll 242 is disposed at a position distanced from the outlet 230e of the drying furnace 230 by 360 mm in the lateral direction MH, and the second cooling roll 242 is disposed above the first cooling roll 241 in the height direction NH such that the second cooling roll 242 makes contact with the single-sided positive plate 1y (or the double-sided positive plate 1w) from the upper side in the height direction NH. The second cooling roll 242 is also heated by radiant heat from the drying furnace 230. More specifically, a temperature Tr(2) of a roll surface 242a of the second cooling roll 242 is Tr(2)=35° C.

The center of the third cooling roll 243 is disposed at a position distanced from the outlet 230e of the drying furnace 230 by 480 mm in the lateral direction MH, and the third cooling roll 243 is disposed at the same position as the first cooling roll 241 in the height direction NH such that the third cooling roll 243 makes contact with the single-sided positive plate 1y (or the double-sided positive plate 1w) from the lower side in the height direction NH. Since the third cooling roll 243 is sufficiently distanced from the drying furnace 230, the third cooling roll 243 is barely heated by radiant heat from the drying furnace 230. On this account, a temperature Tr(3) of a roll surface 243a of the third cooling roll 243 is Tr(3)=25° C. that is generally equal to the room temperature. As such, in the present embodiment, respective temperatures Tr(y) of the roll surfaces 241a, 242a, 243a of the cooling rolls 241, 242, 243 are Tr(1)=50° C., Tr(2)=35° C., and Tr(3)=25° C., so that a relationship of Tr(1)>Tr(2)>Tr(3) is established.

Further, since the cooling rolls 241, 242, 243 are disposed as described above, a wrap angle θ1 between the first cooling roll 241 and the single-sided positive plate 1y (or the double-sided positive plate 1w) is θ1=25°. The wrap angle is an angle of an arc shape portion of the cooling roll which is wrapped by the single-sided positive plate. Further, since the outside diameter of the first cooling roll 241 is 80 mm as described above, a contact length L(1), in the longitudinal direction EH, between the first cooling roll 241 and the single-sided positive plate 1y (or the double-sided positive plate 1w) is 17.5 mm. Further, a wrap angle θ2 between the second cooling roll 242 and the single-sided positive plate 1y (or the double-sided positive plate 1w) is θ2=40°, and a contact length L(2), in the longitudinal direction EH, between the second cooling roll 242 and the single-sided positive plate 1y (or the double-sided positive plate 1w) is 28 mm. Further, a wrap angle θ3 between the third cooling roll 243 and the single-sided positive plate 1y (or the double-sided positive plate 1w) is θ3=105°, and a contact length L(3), in the longitudinal direction EH, between the third cooling roll 243 and the single-sided positive plate 1y (or the double-sided positive plate 1w) is 73 mm. As such, in the present embodiment, respective contact lengths L(y) are L(1)=17.5 mm, L(2)=28 mm, and L(3)=73 mm, so that a relationship of L(1)<L(2)<L(3) is established.

At the outlet 230e of the drying furnace 230, a temperature Td(0) of the single-sided positive plate 1y (or the double-sided positive plate 1w) is Td(0)=90° C. In the meantime, a temperature Td(1) of the single-sided positive plate 1y (or the double-sided positive plate 1w) after the single-sided positive plate 1y (or the double-sided positive plate 1w) has made contact with the first cooling roll 241 is Td(1)=60° C. Accordingly, a temperature difference ΔTd(1) therebetween is Td(0)−Td(1)=90−60=30° C. Further, a temperature Td(2) of the single-sided positive plate 1y (or the double-sided positive plate 1w) after the single-sided positive plate 1y (or the double-sided positive plate 1w) has made contact with the second cooling roll 242 is Td(2)=40° C. Accordingly, a temperature difference ΔTd(2) is Td(1)−Td(2)=60−40=20° C. Further, a temperature Td(3) of the single-sided positive plate 1y (or the double-sided positive plate 1w) after the single-sided positive plate 1y (or the double-sided positive plate 1w) has made contact with the third cooling roll 243 is Td(3)=25° C. (the same as the room temperature). Accordingly, a temperature difference ΔTd(3) is Td(2)−Td(3)=40−25=15° C.

As such, in the present embodiment, respective temperature differences ΔTd(y) of the single-sided positive plate 1y (or the double-sided positive plate 1w) are ΔTd(1)=30° C., ΔTd(2)=20° C., and ΔTd(3)=15° C., so that a relationship of ΔTd(1)>ΔTd(2)>ΔTd(3) is established. In the meantime, respective contact lengths L(y), in the longitudinal direction EH, of the cooling rolls 241, 242, 243 with the single-sided positive plate 1y (or the double-sided positive plate 1w) have a relationship of L(1)<L(2)<L(3). Accordingly, in the present embodiment, as the temperature difference ΔTd(y) is larger, the contact length L(y) is shorter.

The wind-up and conveyance portion 250 includes a wind-up roll 251 configured to wind up the single-sided positive plate 1y (or the double-sided positive plate 1w), and a conveyance roll 253 configured to convey the single-sided positive plate 1y (or the double-sided positive plate 1w) in the longitudinal direction EH, and the wind-up and conveyance portion 250 is configured to convey the single-sided positive plate 1y (or the double-sided positive plate 1w) cooled down by the cooling portion 240 and wind up the single-sided positive plate 1y (or the double-sided positive plate 1w) around the wind-up roll 251.

Next will be described the manufacturing method of the belt-shaped positive plate 1 and the manufacturing method of the cell 100 using the belt-shaped positive plate 1. First, the positive electrode paste DP is prepared before the first wet layer forming step S11 (see FIG. 6) is performed by use of the electrode plate manufacturing apparatus 200. The positive electrode paste DP is a paste obtained by kneading the positive-electrode active material particles (lithium nickel cobalt manganese oxide particles), the conductive particles (AB particles), and the binder (PVDF) with a dispersion medium (N-methylpyrrolidone (NMP)). The solid fraction of the positive electrode paste DP is set to 60% by weight (the ratio of NMP is 40% by weight).

In the first wet layer forming step S11, the positive electrode paste DP is applied to the first principal surface 3a of the positive-electrode current collector foil 3 by use of the electrode plate manufacturing apparatus 200, so that the wet first active material layer 5x is formed. More specifically, the positive-electrode current collector foil 3 sent from the feed roll 211 of the supply portion 210 is conveyed to the die coating portion 220 in the longitudinal direction EH by the conveyance rolls 213 of the supply portion 210. Subsequently, a predetermined discharge amount of the positive electrode paste DP is discharged from the coating die 221 toward the first principal surface 3a of the positive-electrode current collector foil 3 conveyed by the backup roll 223 of the die coating portion 220, so that a coating film (the wet first active material layer 5x) is continuously formed in a belt shape on the first principal surface 3a of the positive-electrode current collector foil 3 (the wet single-sided positive plate 1x is formed continuously).

Subsequently, in a "first drying step S12," the wet single-sided positive plate 1x is conveyed in the longitudinal direction EH so as to be carried into the drying furnace 230, and while the wet single-sided positive plate 1x is conveyed in the longitudinal direction EH inside the drying furnace 230, the wet first active material layer 5x on the wet single-sided positive plate 1x is dried by heating, so that the first positive-electrode active material layer 5 is formed. More specifically, the wet single-sided positive plate 1x carried into the drying room 233 of the drying furnace 230 is conveyed in the longitudinal direction EH by the conveyance rolls 235. In the meantime, the hot air NF at 180° C. is blown from the hot air blowing portions 237 to the wet first active material layer 5x on the wet single-sided positive plate 1x that is being conveyed. Hereby, the wet first active material layer 5x is dried, so that the first positive-electrode active material layer 5 is formed continuously. Note that a belt-shaped positive plate (a belt-shaped electrode plate) in which the first positive-electrode active material layer 5 is formed on the first principal surface 3a of the positive-electrode current collector foil 3 is referred to as the single-sided positive plate 1y. The single-sided positive plate 1y is carried out from the drying furnace 230 through the outlet 230e of the drying furnace 230.

Subsequently, in a "first cooling step S13," the single-sided positive plate 1y carried out from the drying furnace 230 (the temperature Td(0) of the single-sided positive plate 1y at the outlet 230e of the drying furnace 230 is Td(0)=90° C.) is cooled down to 25° C. (the room temperature) in the cooling portion 240. The cooling rolls 241, 242, 243 (n=3) of the cooling portion 240 make contact with the single-sided positive plate 1y so as to cool down the single-sided positive plate 1y while the single-sided positive plate 1y is bent in the thickness direction GH and is conveyed in the longitudinal direction EH by the cooling rolls 241, 242, 243.

More specifically, the single-sided positive plate 1y carried out from the drying furnace 230 first makes contact with the first cooling roll 241 so as to be cooled down by the first cooling roll 241. As described above, the temperature Tr(1) of the roll surface 241a of the first cooling roll 241 is Tr(1)=50° C. due to radiant heat from the drying furnace 230. Further, the wrap angle $\theta 1$ between the first cooling roll 241 and the single-sided positive plate 1y is $\theta 1=25°$, and the contact length L(1), in the longitudinal direction EH, between the first cooling roll 241 and the single-sided positive plate 1y is 17.5 mm. When the single-sided positive plate 1y has passed through the first cooling roll 241, the temperature of the single-sided positive plate 1y having the temperature Td(0) of 90° C. at the outlet 230e of the drying furnace 230 is decreased to the temperature Td(1)=60° C., and thus, the single-sided positive plate 1y is cooled down only by the temperature difference $\Delta Td(1)=Td(0)-Td(1)=90-60=30°$ C.

Subsequently, the single-sided positive plate 1y makes contact with the second cooling roll 242 so as to be cooled down by the second cooling roll 242. As described above, the temperature Tr(2) of the roll surface 242a of the second cooling roll 242 is Tr(2)=35° C. due to radiant heat from the drying furnace 230. Further, the wrap angle $\theta 2$ between the second cooling roll 242 and the single-sided positive plate 1y is $\theta 2=40°$, and the contact length L(2), in the longitudinal direction EH, between the second cooling roll 242 and the single-sided positive plate 1y is 28 mm. When the single-sided positive plate 1y has passed through the second cooling roll 242, the temperature of the single-sided positive plate 1y having the temperature Td(1) of 60° C. just after the single-sided positive plate 1y has made contact with the first cooling roll 241 is decreased to Td(2)=40° C., and thus, the single-sided positive plate 1y is cooled down only by the temperature difference $\Delta Td(2)=Td(1)-Td(2)=60-40=20°$ C.

Subsequently, the single-sided positive plate 1y makes contact with the third cooling roll 243 so as to be cooled down by the third cooling roll 243. As described above, the third cooling roll 243 is barely affected by radiant heat from the drying furnace 230, so that the temperature Tr(3) of the roll surface 243a is Tr(3)=25° C. that is generally the same as the room temperature. Further, the wrap angle $\theta 3$ between the third cooling roll 243 and the single-sided positive plate 1y is $\theta 3=105°$, and the contact length L(3), in the longitudinal direction EH, between the third cooling roll 243 and the single-sided positive plate 1y is 73 mm. When the single-sided positive plate 1y has passed through the third cooling roll 243, the temperature of the single-sided positive plate 1y having the temperature Td(2) of 40° C. after the single-sided positive plate 1y has made contact with the second cooling roll 242 has the temperature Td(3) of 25° C., and thus, the single-sided positive plate 1y is cooled down only by the temperature difference $\Delta Td(3)=Td(2)-Td(3)=40-25=15°$ C.

As such, in the present embodiment, respective temperatures Tr(y) of the roll surfaces 241a, 242a, 243a of the cooling rolls 241, 242, 243 are Tr(1)=50° C., Tr(2)=35° C., and Tr(3)=25° C., so that the relationship of Tr(1)>Tr(2)>Tr(3) is established. Further, respective contact lengths L(y) of the cooling rolls 241, 242, 243 with the single-sided positive plate 1y are L(1)=17.5 mm, L(2)=28 mm, and L(3)=73 mm, so that the relationship of L(1)<L(2)<L(3) is established. Further, respective temperature differences ΔTd(y) of the single-sided positive plate 1y are ΔTd(1)=30° C., ΔTd(2) =20° C., and ΔTd(3)=15° C., so that the relationship of ΔTd(1)>ΔTd(2)>ΔTd(3) is established. Accordingly, the cooling rolls 241, 242, 243 and the single-sided positive plate 1y have such a relationship that, as the temperature difference ΔTd(y) is larger, the contact length L(y) is shorter.

The single-sided positive plate 1y cooled down by the cooling portion 240 is conveyed to the wind-up roll 251 by the conveyance roll 253 of the wind-up and conveyance portion 250 and is wound up by the wind-up roll 251. Note that, in the present embodiment, a second wet layer forming step S14 (described later) is performed after the single-sided positive plate 1y thus subjected to the first cooling step S13 is wound up once, but the second wet layer forming step S14 can be performed following the first cooling step S13 without winding up the single-sided positive plate 1y.

Then, in the "second wet layer forming step S14," the positive electrode paste DP is applied to the second principal surface 3b of the positive-electrode current collector foil 3 in the single-sided positive plate 1y, so that the wet second active material layer 6x is formed. Note that a wet positive plate (a wet electrode plate) in which the first positive-electrode active material layer 5 that is dried is formed on the first principal surface 3a of the positive-electrode current collector foil 3 and the wet second active material layer 6x that is not dried is formed on the second principal surface 3b of the positive-electrode current collector foil 3 is also referred to as the wet double-sided positive plate 1z. The second wet layer forming step S14 to a second cooling step S16 (described later) are also performed continuously by use of the electrode plate manufacturing apparatus 200. More specifically, the feed roll 211 around which the single-sided positive plate 1y is wound is set in the supply portion 210 of the electrode plate manufacturing apparatus 200. The single-sided positive plate 1y sent from the feed roll 211 of the supply portion 210 is conveyed to the die coating portion 220 by the conveyance rolls 213. Subsequently, a predetermined discharge amount of the positive electrode paste DP is discharged from the coating die 221 toward the second principal surface 3b of the positive-electrode current collector foil 3 of the single-sided positive plate 1y conveyed by the backup roll 223 of the die coating portion 220, so that a coating film (the wet second active material layer 6x) is continuously formed in a belt shape on the second principal surface 3b (the wet double-sided positive plate 1z is formed continuously).

Subsequently, in a "second drying step S15," the wet double-sided positive plate 1z is conveyed in the longitudinal direction EH so as to be carried into the drying furnace 230, and while the wet double-sided positive plate 1z is conveyed in the longitudinal direction EH inside the drying furnace 230, the wet second active material layer 6x on the wet double-sided positive plate 1z is dried by heating, so that the second positive-electrode active material layer 6 is formed. More specifically, while the wet double-sided positive plate 1z is conveyed in the longitudinal direction EH by the conveyance rolls 235, the hot air NF is blown from the hot air blowing portions 237 to the wet second active material layer 6x of the wet double-sided positive plate 1z. Hereby, the wet second active material layer 6x is dried, so that the second positive-electrode active material layer 6 is formed. Note that a belt-shaped positive plate (a belt-shaped electrode plate) in which the first positive-electrode active material layer 5 is formed on the first principal surface 3a of the positive-electrode current collector foil 3 and the second positive-electrode active material layer 6 is formed on the second principal surface 3b is also referred to as the double-sided positive plate 1w.

Subsequently, in the "second cooling step S16," the double-sided positive plate 1w carried out from the drying furnace 230 (the temperature Td(0) of the double-sided positive plate 1w at the outlet 230e of the drying furnace 230 is Td(0)=90° C.) is cooled down to 25° C. (the room temperature) in the cooling portion 240. The cooling rolls 241, 242, 243 (n=3) of the cooling portion 240 make contact with the double-sided positive plate 1w so as to cool down the double-sided positive plate 1w while the double-sided positive plate 1w is bent in the thickness direction GH and is conveyed in the longitudinal direction EH by the cooling rolls 241, 242, 243.

More specifically, similarly to the first cooling step S13, the double-sided positive plate 1w carried out from the drying furnace 230 is first cooled down by the first cooling roll 241 from the temperature Td(0)=90° C. to the temperature Td(1)=60° C., and thus, the double-sided positive plate 1w is cooled down by the temperature difference ΔTd(1) =30° C. Subsequently, the double-sided positive plate 1w is cooled down by the second cooling roll 242 from the temperature Td(1)=60° C. to the temperature Td(2)=40° C., and thus, the double-sided positive plate 1w is cooled down by the temperature difference ΔTd(2)=20° C. Subsequently, the double-sided positive plate 1w is cooled down by the third cooling roll 243 from the temperature Td(2)=40° C. to the temperature Td(3)=25° C., and thus, the double-sided positive plate 1w is cooled down by the temperature difference ΔTd(3)=15° C.

Similarly to the first cooling step S13, in the second cooling step S16, respective temperatures Tr(y) of the roll surfaces 241a, 242a, 243a of the cooling rolls 241, 242, 243 are Tr(1)=50° C., Tr(2)=35° C., and Tr(3)=25° C., and thus, the relationship of Tr(1)>Tr(2)>Tr(3) is established. Further, respective contact lengths L(y) of the cooling rolls 241, 242, 243 with the double-sided positive plate 1w are L(1)=17.5 mm, L(2)=28 mm, and L(3)=73 mm, so that the relationship of L(1)<L(2)<L(3) is established. Further, respective temperature differences ΔTd(y) of the double-sided positive plate 1w are ΔTd(1)=30° C., ΔTd(2)=20° C., and ΔTd(3) =15° C., so that the relationship of ΔTd(1)>ΔTd(2)>ΔTd(3) is established. Accordingly, the cooling rolls 241, 242, 243 and the double-sided positive plate 1w have such a relationship that, as the temperature difference ΔTd(y) is larger, the contact length L(y) is shorter.

The double-sided positive plate 1w cooled down by the cooling portion 240 is conveyed to the wind-up roll 251 by the conveyance roll 253 of the wind-up and conveyance portion 250 and is wound up by the wind-up roll 251. Note that, in the present embodiment, a press step S17 (described later) is performed after the double-sided positive plate 1w thus subjected to the second cooling step S16 is wound up once, but the press step S17 can be performed following the second cooling step S16 without winding up the double-sided positive plate 1w.

Subsequently, in the "press step S17," roll press is performed while the double-sided positive plate 1w is conveyed in the longitudinal direction EH by a roll press device (not shown), so that the first positive-electrode active material layer 5 and the second positive-electrode active material layer 6 are pressed and consolidated in the thickness direction GH. Hereby, a consolidated positive plate 1v is formed. Then, in a "cutting step S18," the consolidated positive plate 1v is cut (divided into two) in the longitudinal direction EH at the center in the width direction FH. Thus, the belt-shaped positive plate 1 illustrated in FIG. 4 is provided.

Further, in a "negative plate manufacturing step S2" (see FIG. 5), the belt-shaped negative plate 131 is manufactured separately. A negative electrode paste (not shown) is prepared in advance by kneading the negative-electrode active material particles (graphite particles), the binder (SBR), and the thickener (CMC) with a dispersion medium (water). Then, the negative electrode paste is applied to the first principal surface 133*a* of the negative-electrode current collector foil 133 by die coating, so that a wet first active material layer is formed. After that, the wet first active material layer is dried by heating, so that the first negative-electrode active material layer 135 is formed.

Then, the negative electrode paste is applied to the second principal surface 133*b* of the negative-electrode current collector foil 133 by die coating, so that a wet second active material layer is formed. After that, the wet second active material layer is dried by heating, so that the second negative-electrode active material layer 136 is formed. After that, this negative plate is subjected to roll press, so that the first negative-electrode active material layer 135 and the second negative-electrode active material layer 136 are pressed and consolidated in the thickness direction. After that, the negative plate is cut (divided into two) in the longitudinal direction IH at the center in the width direction JH. Thus, the belt-shaped negative plate 131 is provided.

Subsequently, in an "electrode body forming step S3" (see FIG. 5), the positive plate 1 and the negative plate 131 are laminated via the separators 141, 143 prepared separately and wounded around the axis AX (see FIG. 3) and then compressed into a flat shape (see FIG. 2), so that the flat wound-type electrode body 120 is formed.

Subsequently, in a "cell assembly step S4," the cell 100 is assembled. More specifically, the case cover member 113 is prepared, and the positive terminal member 150 and the negative terminal member 160 are secured to the case cover member 113 (see FIG. 1). After that, the positive terminal member 150 and the negative terminal member 160 are welded to the positive plate 1 and the negative plate 131 of the electrode body 120, respectively. After that, the electrode body 120 is inserted into the case body member 111, and the opening of the case body member 111 is closed by the case cover member 113. The case body member 111 and the case cover member 113 are welded to each other, and thus, the cell case 110 is formed.

Then, in an "injection and sealing step S5," the electrolytic solution 105 is injected into the cell case 110 through an injection hole 113*h* provided in the case cover member 113, so that the electrode body 120 is impregnated with the electrolytic solution 105. After that, the injection hole 113*h* is sealed by a sealing member 115. Subsequently, in an "inspection step S6," various inspections and initial charge are performed on the cell 100. Hereby, the cell 100 is finished.

EXAMPLES

Next will be described a result of a test performed to verify the effect of the disclosure. As an example, similarly to the embodiment, the belt-shaped positive plate (the single-sided positive plate 1*y*) including the first positive-electrode active material layer 5 on the positive-electrode current collector foil 3 was formed by performing the first wet layer forming step S11, the first drying step S12, and the first cooling step S13 by use of the electrode plate manufacturing apparatus 200. As described above, the electrode plate manufacturing apparatus 200 of the embodiment includes the cooling rolls 241, 242, 243 (n=3). The cooling rolls 241, 242, 243 do not make point contact with the single-sided positive plate 1*y*, but the cooling rolls 241, 242, 243 make contact with the single-sided positive plate 1*y* with the contact length L(y) and convey the single-sided positive plate 1*y* in the longitudinal direction EH while the single-sided positive plate 1*y* is bent in the thickness direction GH (referred to as "BENDING CONVEYANCE" in the field of "CONVEYANCE BY COOLING ROLL" in TABLE 1). Further, in the embodiment (the example), as the temperature difference ΔTd(y) of the single-sided positive plate 1*y* is larger, the contact length L(y) of the cooling roll 241, 242, 243 with the single-sided positive plate 1*y* is shorter. More specifically, the temperature difference ΔTd(y) satisfies the relationship of ΔTd(1)>ΔTd(2)>ΔTd(3) and the contact length L(y) satisfies the relationship of L(1)<L(2)<L(3) (evaluated as "YES" in the field of "CONTACT LENGTH L(y) IS SHORTER AS TEMPERATURE DIFFERENCE ΔTd(y) IS LARGER" in TABLE 1).

TABLE 1

| | NUMBER n OF COOLING ROLLS | CONVEYANCE BY COOLING ROLL | CONTACT LENGTH L(y) IS SHORTER AS TEMPERATURE DIFFERENCE ΔTd(y) IS LARGER | OCCURRENCE OF WRINKLES | OCCURRENCE OF METAL POWDER |
|---|---|---|---|---|---|
| EXAMPLE | TWO OR MORE | BENDING CONVEYANCE | YES | NO WRINKLES | NO METAL POWDER |
| FIRST COMPARATIVE EXAMPLE | ONE | BENDING CONVEYANCE | — | WRINKLES FORMED | NO METAL POWDER |
| SECOND COMPARATIVE EXAMPLE | TWO OR MORE | BENDING CONVEYANCE | NO | WRINKLES FORMED | NO METAL POWDER |
| THIRD COMPARATIVE EXAMPLE | TWO OR MORE | BENDING CONVEYANCE | NO | WRINKLES FORMED | NO METAL POWDER |

First Comparative Example

In the meantime, as a first comparative example, an electrode plate manufacturing apparatus (see FIG. 9) different from the electrode plate manufacturing apparatus 200 of the embodiment in the configuration of the cooling portion 240 was prepared, and the single-sided positive plate 1*y* was formed by performing the first wet layer forming step S11, the first drying step S12, and the first cooling step S13 by use of the electrode plate manufacturing apparatus. A cooling portion 740 of the first comparative example includes only one cooling roll 741. The outside diameter of the cooling roll 741 is the same as the outside diameter of the cooling rolls 241, 242, 243 of the embodiment. The center of the cooling roll 741 is disposed at a position distanced from the outlet 230e of the drying furnace 230 by 480 mm in the lateral direction MH, that is, the cooling roll 741 is disposed at the same position as the third cooling roll 243 in the embodiment.

The cooling roll 741 is barely heated by radiant heat from the drying furnace 230, so that a temperature Tr(1) of a roll surface 741a is Tr(1)=25° C. Further, a wrap angle θ1 between the cooling roll 741 and the single-sided positive plate 1y is θ1=25°, and a contact length L(1), in the longitudinal direction EH, between the cooling roll 741 and the single-sided positive plate 1y is 17.5 mm. Further, a temperature Td(1) of the single-sided positive plate 1y after the single-sided positive plate 1y makes contact with the cooling roll 741 is Td(1)=25° C. Accordingly, a temperature difference ΔTd(1) is ΔTd(1)=Td(0)−Td(1)=90−25=65°.

Second Comparative Example

Figure 10:
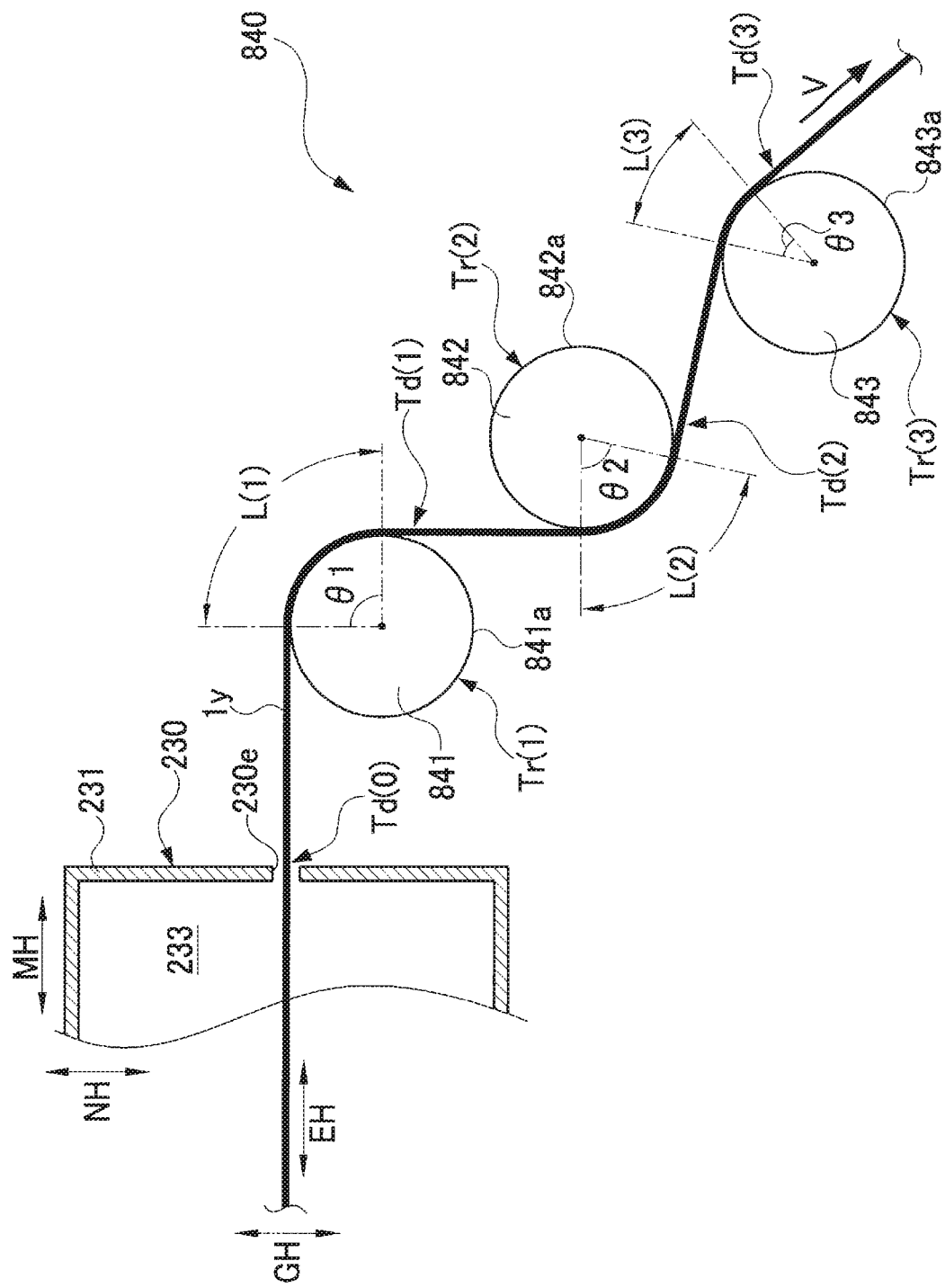
FIG. 10 is an explanatory view illustrating the vicinity of cooling rolls according to a second comparative example.

As a second comparative example, an electrode plate manufacturing apparatus (see FIG. 10) different from the electrode plate manufacturing apparatus 200 of the embodiment in the configuration of the cooling portion 240 was prepared, and the single-sided positive plate 1y was formed by performing the first wet layer forming step S11, the first drying step S12, and the first cooling step S13 by use of the electrode plate manufacturing apparatus. A cooling portion 840 of the second comparative example includes three cooling rolls (a first cooling roll 841, a second cooling roll 842, and a third cooling roll 843). The outside diameter of the cooling rolls 841, 842, 843 is the same as the outside diameter of the cooling rolls 241, 242, 243 of the embodiment.

The center of the first cooling roll 841 is disposed at a position distanced from the outlet 230e of the drying furnace 230 by 220 mm in the lateral direction MH, that is, the first cooling roll 841 is disposed at the same position as the first cooling roll 241 of the embodiment. A temperature Tr(1) of a roll surface 841a of the first cooling roll 841 is Tr(1)=50° C. The center of the second cooling roll 842 is disposed at a position distanced from the outlet 230e of the drying furnace 230 by 300 mm in the lateral direction MH, and the second cooling roll 842 is disposed at a position where the single-sided positive plate 1y that has passed through the first cooling roll 841 is conveyed downward in the height direction NH. A temperature Tr(2) of a roll surface 842a of the second cooling roll 842 is Tr(2)=35° C. The center of the third cooling roll 843 is disposed at a position distanced from the outlet 230e of the drying furnace 230 by 380 mm in the lateral direction MH, and the third cooling roll 843 is disposed below the second cooling roll 842 in the height direction NH such that the third cooling roll 843 makes contact with the single-sided positive plate 1y from the lower side in the height direction NH. A temperature Tr(3) of a roll surface 843a of the third cooling roll 843 is Tr(3)=25° C.

Since the cooling rolls 841, 842, 843 are disposed as described above, a wrap angle θ1 between the first cooling roll 841 and the single-sided positive plate 1y is θ1=90°, and a contact length L(1), in the longitudinal direction EH, between the first cooling roll 841 and the single-sided positive plate 1y is 63 mm. Further, a wrap angle θ2 between the second cooling roll 842 and the single-sided positive plate 1y is θ2=75°, and a contact length L(2), in the longitudinal direction EH, between the second cooling roll 842 and the single-sided positive plate 1y is 52 mm. Further, a wrap angle θ3 between the third cooling roll 843 and the single-sided positive plate 1y is θ3=30°, and a contact length L(3), in the longitudinal direction EH, between the third cooling roll 843 and the single-sided positive plate 1y is 21 mm. In the second comparative example, respective contact lengths L(y) are L(1)=63 mm, L(2)=52 mm, and L(3)=21 mm, so that a relationship of L(1)>L(2)>L(3) that is reverse to the relationship of L(1)<L(2)<L(3) in the example is established.

Further, in the second comparative example, a temperature Td(1) of the single-sided positive plate 1y after the single-sided positive plate 1y has made contact with the first cooling roll 841 is Td(1)=55° C. Accordingly, a temperature difference ΔTd(1) is ΔTd(1)=Td(0)−Td(1)=90−55=35° C. Further, a temperature Td(2) of the single-sided positive plate 1y after the single-sided positive plate 1y has made contact with the second cooling roll 842 is Td(2)=37° C. Accordingly, a temperature difference ΔTd(2) is ΔTd(2)=Td(1)−Td(2)=55−37=18° C. Further, a temperature Td(3) of the single-sided positive plate 1y after the single-sided positive plate 1y has made contact with the third cooling roll 843 is Td(3)=25° C. Accordingly, a temperature difference ΔTd(3) is ΔTd(3)=Td(2)−Td(3)=37−25=12° C.

In the second comparative example, respective temperature differences ΔTd(y) of the single-sided positive plate 1y are ΔTd(1)=35° C., ΔTd(2)=18° C., and ΔTd(3)=12° C., so that the relationship of ΔTd(1)>ΔTd(2)>ΔTd(3) is established similarly to the example. In the meantime, as described above, the contact lengths L(y) of the cooling rolls 841, 842, 843 with the single-sided positive plate 1y have the relationship of L(1)>L(2)>L(3). Accordingly, differently from the example, the contact lengths L(y) do not satisfy such a relationship that, as the temperature difference ΔTd(y) is larger, the contact length L(y) is shorter (evaluated as "NO" in the field of "CONTACT LENGTH L(y) IS SHORTER AS TEMPERATURE DIFFERENCE ΔTd(y) IS LARGER" in TABLE 1).

Third Comparative Example

Figure 11:
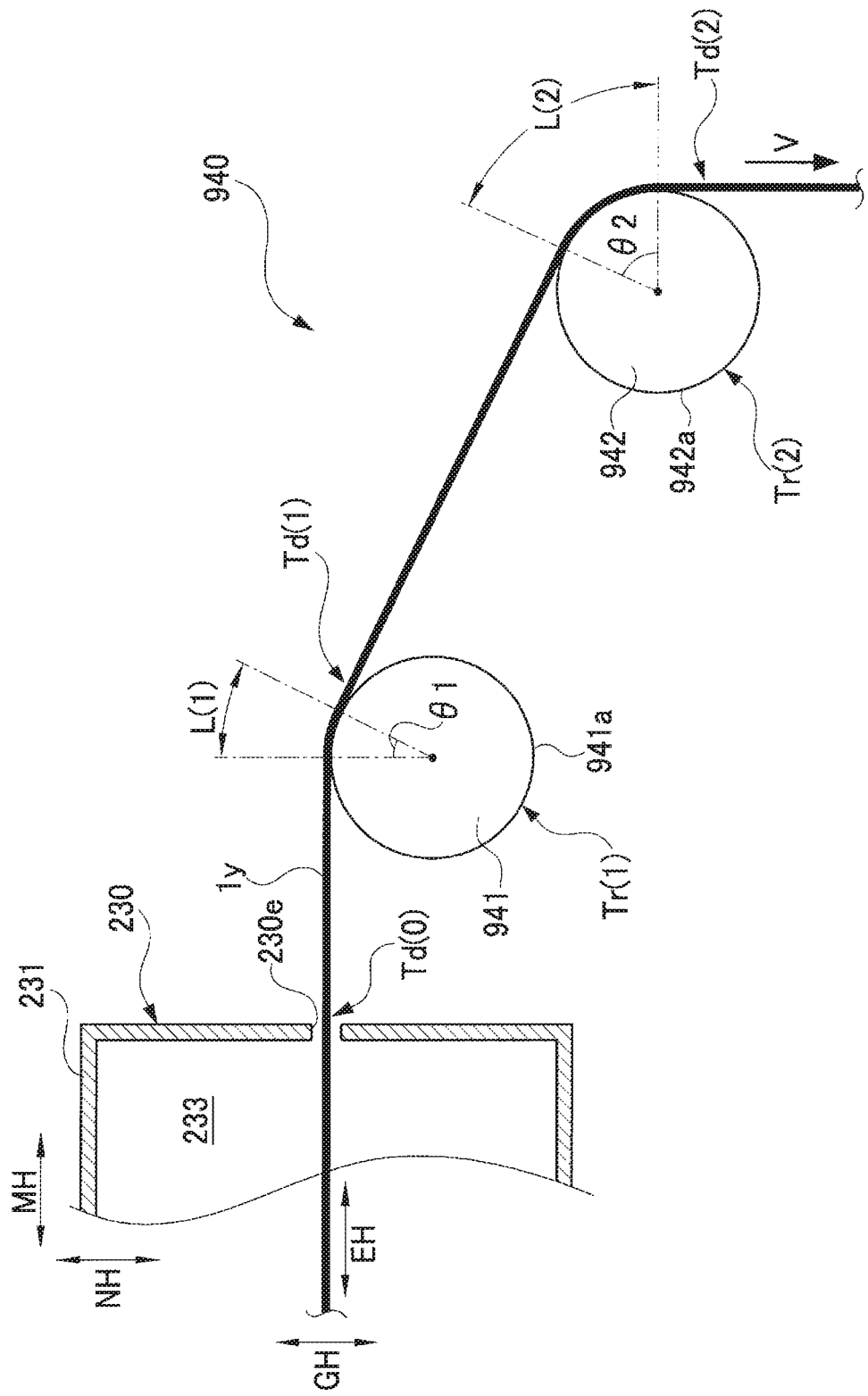
FIG. 11 is an explanatory view illustrating the vicinity of cooling rolls according to a third comparative example.

As a third comparative example, an electrode plate manufacturing apparatus (see FIG. 11) different from the electrode plate manufacturing apparatus 200 of the embodiment in the configuration of the cooling portion 240 was prepared, and the single-sided positive plate 1y was formed by performing the first wet layer forming step S11, the first drying step S12, and the first cooling step S13 by use of the electrode plate manufacturing apparatus. A cooling portion 940 of the third comparative example includes two cooling rolls (a first cooling roll 941 and a second cooling roll 942). The outside diameter of the cooling rolls 941, 942 is the same as the outside diameter of the cooling rolls 241, 242, 243 of the embodiment.

The center of the first cooling roll 941 is disposed at a position distanced from the outlet 230e of the drying furnace 230 by 220 mm in the lateral direction MH, that is, the first cooling roll 941 is disposed at the same position as the first cooling roll 241 of the embodiment. A temperature Tr(1) of a roll surface 941a of the first cooling roll 941 is Tr(1)=50° C. The center of the second cooling roll 942 is disposed at a position distanced from the outlet 230e of the drying furnace 230 by 480 mm in the lateral direction MH, and the second cooling roll 942 is disposed below the first cooling roll 941 in the height direction NH such that the second cooling roll 942 makes contact with the single-sided positive plate 1y from the lower side in the height direction NH. A temperature Tr(2) of a roll surface 942a of the second cooling roll 942 is Tr(2)=25° C.

Since the cooling rolls 941, 942 are disposed as described above, a wrap angle θ1 between the first cooling roll 941 and the single-sided positive plate 1y is θ1=25°, and a contact length L(1), in the longitudinal direction EH, between the first cooling roll 941 and the single-sided positive plate 1y is 17.5 mm. Further, a wrap angle θ2 between the second cooling roll 942 and the single-sided positive plate 1y is θ2=75°, and a contact length L(2), in the longitudinal direction EH, between the second cooling roll 942 and the single-sided positive plate 1y is 52 mm. In the third comparative example, respective contact lengths L(y) are L(1)=17.5 mm and L(2)=52 mm, so that a relationship of L(1)<L(2) is established.

Further, in the third comparative example, a temperature Td(1) of the single-sided positive plate 1y after the single-sided positive plate 1y has made contact with the first cooling roll 941 is Td(1)=60° C. Accordingly, a temperature difference ΔTd(1) is ΔTd(1)=Td(0)−Td(1)=90−60=30° C. Further, a temperature Td(2) of the single-sided positive plate 1y after the single-sided positive plate 1y has made contact with the second cooling roll 942 is Td(2)=25° C. Accordingly, a temperature difference ΔTd(2) is ΔTd(2)=Td(1)−Td(2)=60−25=35° C.

In the third comparative example, respective temperature differences ΔTd(y) of the single-sided positive plate 1y are ΔTd(1)=30° C. and ΔTd(2)=35° C., so that a relationship of ΔTd(1)<ΔTd(2) is established. In the meantime, as described above, the contact lengths L(y) of the cooling rolls 941, 942 with the single-sided positive plate 1y have the relationship of L(1)<L(2). This is reverse to the example, and the third comparative example does not satisfy such a relationship that, as the temperature difference ΔTd(y) is larger, the contact length L(y) is shorter.

Figure 9:
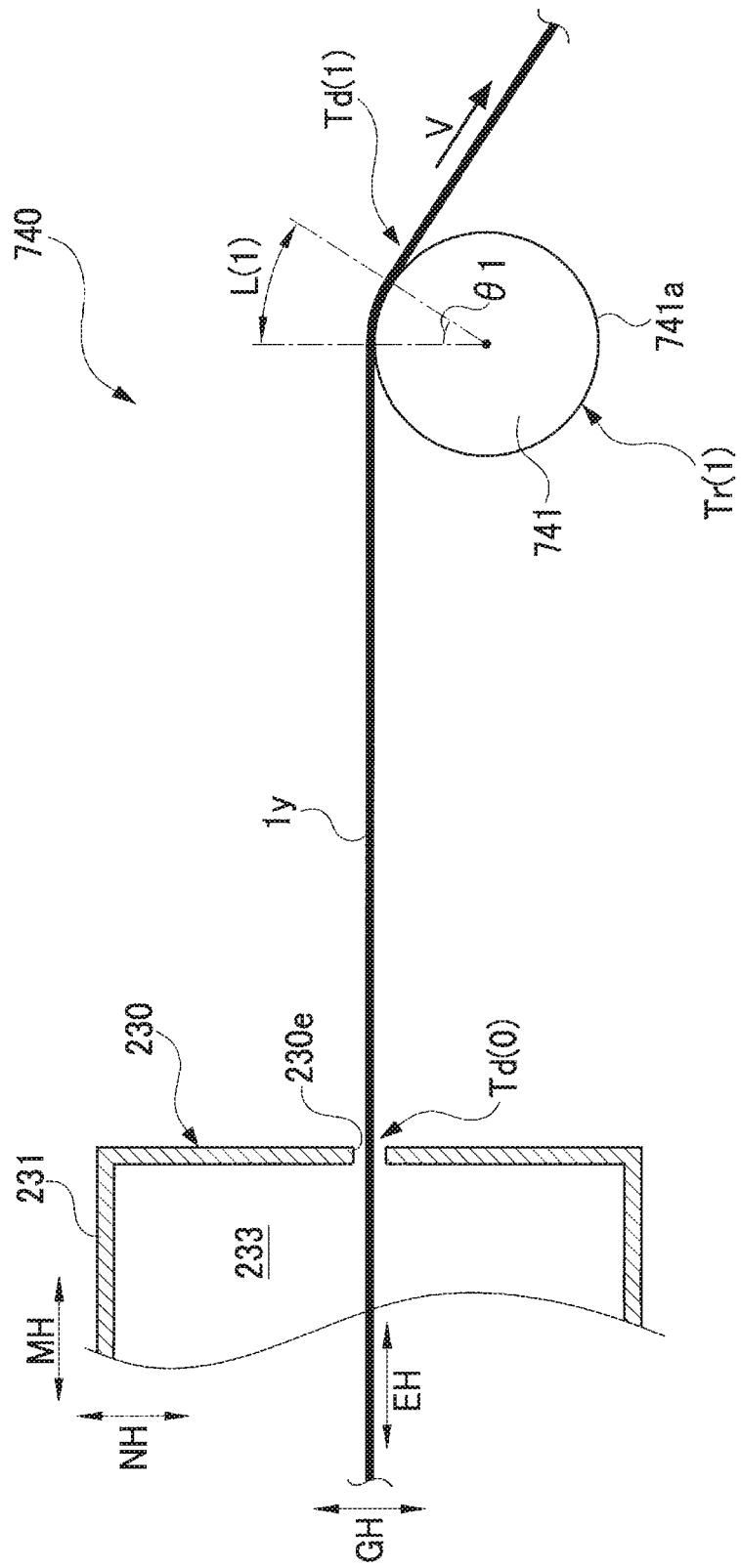
FIG. 9 is an explanatory view illustrating the vicinity of a cooling roll according to a first comparative example.

Subsequently, in terms of the single-sided positive plates 1y of the example and the first to third comparative examples, whether wrinkles were formed or not was examined by visual inspection. As a result, no wrinkle was formed in the single-sided positive plate 1y of the example. In the meantime, wrinkles were formed in the single-sided positive plates 1y of the first to third comparative examples. A presumable reason why such a result was obtained is as follows. That is, first, in the first comparative example 1 (see FIG. 9), the cooling roll 741 is disposed to be distanced from the outlet 230e of the drying furnace 230. On this account, the single-sided positive plate 1y greatly bends downward in the height direction NH between the outlet 230e of the drying furnace 230 and the cooling roll 741 (FIG. 9 illustrates a state where the single-sided positive plate 1y does not bend, for convenience). Accordingly, it is considered that wrinkles were formed in the single-sided positive plate 1y when the single-sided positive plate 1y made contact with the cooling roll 741.

Note that, when the cooling roll 741 is disposed closer to the outlet 230e of the drying furnace 230 in the first comparative example in order to restrain bending of the single-sided positive plate 1y, the temperature of the roll surface 741a of the cooling roll 741 becomes high due to radiant heat from the drying furnace 230, so that the temperature of the single-sided positive plate 1y after the single-sided positive plate 1y has passed through the cooling roll 741 becomes high. In this case, it is necessary to lengthen a conveyance path in the downstream from the cooling roll 741 so as to cool down the single-sided positive plate 1y naturally, thereby resulting in that the electrode plate manufacturing apparatus 200 is elongated. This is unfavorable.

Further, in the second comparative example, since the cooling rolls 841, 842, 843 are used, wrinkles can be prevented from being formed in the single-sided positive plate 1y due to bending of the single-sided positive plate 1y during conveyance like the first comparative example 1. However, as described above, in the second comparative example, while the temperature difference ΔTd(y) of the single-sided positive plate 1y has the relationship of ΔTd(1)>ΔTd(2)>ΔTd(3), the contact lengths L(y) of the cooling rolls 841, 842, 843 with the single-sided positive plate 1y satisfy the relationship of L(1)>L(2)>L(3), so that the relationship that the contact length L(y) is longer as the temperature difference ΔTd(y) is larger is established. In the second comparative example, it is considered that wrinkles were formed in the single-sided positive plate 1y because of such a relationship.

Further, in the third comparative example, since the cooling rolls 941, 942 are used, wrinkles can be prevented from being formed in the single-sided positive plate 1y due to bending of the single-sided positive plate 1y like the first comparative example 1. However, as described above, in the third comparative example, while the temperature difference ΔTd(y) of the single-sided positive plate 1y has the relationship of ΔTd(1)<ΔTd(2), the contact lengths L(y) of the cooling rolls 941, 942 with the single-sided positive plate 1y have the relationship of L(1)<L(2). Thus, similarly to the second comparative example, the relationship that the contact length L(y) is longer as the temperature difference ΔTd(y) is larger is established. On this account, in the third comparative example, it is considered that wrinkles were formed in the single-sided positive plate 1y for the same reason as the second comparative example.

On the other hand, in the example, since the cooling rolls 241, 242, 243 are used, wrinkles can be prevented from being formed in the single-sided positive plate 1y due to bending of the single-sided positive plate 1y like the first comparative example 1. Further, as described above, in the example, while the temperature difference ΔTd(y) of the single-sided positive plate 1y has the relationship of ΔTd(1)>ΔTd(2)>ΔTd(3), the contact lengths L(y) of the cooling rolls 241, 242, 243 with the single-sided positive plate 1y have the relationship of L(1)<L(2)<L(3), so that the relationship that the contact length L(y) is shorter as the temperature difference ΔTd(y) is larger is established. On this account, differently from the second and third comparative examples, it is considered that wrinkles were not formed in the single-sided positive plate 1y.

Note that, in the example and the first to third comparative examples, no metal powder was formed in the cooling portions 240, 740, 840, 940. The cooling rolls 241, 242, 243 and the like in the example and the first to third comparative examples bend the single-sided positive plate 1y in the thickness direction GH and convey the single-sided positive plate 1y, and therefore, it is possible to restrain the cooling rolls 241, 242, 243 and the like from rubbing against the positive-electrode current collector foil 3 of the single-sided positive plate 1y. It is considered that no metal powder was caused from the positive-electrode current collector foil 3 of the single-sided positive plate 1y because of this.

As described above, in the manufacturing method of the belt-shaped positive plate 1, in the first cooling step S13 and the second cooling step S16, the single-sided positive plate 1y and the double-sided positive plate 1w are bent in the thickness direction GH and conveyed in the longitudinal direction EH by the cooling rolls 241, 242, 243 (n=3, in the present embodiment), so that the single-sided positive plate 1y and the double-sided positive plate 1w are cooled down. At this time, the cooling rolls 241, 242, 243 are disposed such that the cooling rolls 241, 242, 243 and each of the single-sided positive plate 1y and the double-sided positive plate 1w have a relationship that the contact length L(y) is shorter as the temperature difference $\Delta Td(y)$ is larger.

By use of the cooling rolls 241, 242, 243, the single-sided positive plate 1y and the double-sided positive plate 1w can be cooled down stepwise. Accordingly, it is possible to prevent such a situation that the temperatures of the single-sided positive plate 1y and the double-sided positive plate 1w suddenly decrease and wrinkles are formed in the single-sided positive plate 1y and the double-sided positive plate 1w. Further, by use of the cooling rolls 241, 242, 243, it is possible to prevent such a situation that the single-sided positive plate 1y and the double-sided positive plate 1w greatly bend downward in the height direction NH during conveyance and wrinkles are formed in the single-sided positive plate 1y and the double-sided positive plate 1w.

Further, since the single-sided positive plate 1y and the double-sided positive plate 1w are bent in the thickness direction GH and conveyed by the cooling rolls 241, 242, 243, it is possible to restrain metal powder or powder of the positive-electrode active material from being caused due to friction of the cooling rolls 241, 242, 243 with the single-sided positive plate 1y and the double-sided positive plate 1w, in comparison with a case where the cooling rolls 241, 242, 243 make point contact with the single-sided positive plate 1y and the double-sided positive plate 1w. Further, since the cooling rolls 241, 242, 243 are disposed such that the cooling rolls 241, 242, 243 and each of the single-sided positive plate 1y and the double-sided positive plate 1w have the relationship that the contact length L(y) is shorter as the temperature difference $\Delta Td(y)$ is larger, it is possible to prevent such a situation that wrinkles are formed in the single-sided positive plate 1y and the double-sided positive plate 1w due to the contact length L(y). As such, in the manufacturing method of the belt-shaped positive plate 1, it is possible to prevent wrinkles from being formed in the single-sided positive plate 1y and the double-sided positive plate 1w conveyed from the drying furnace 230 in the manufacturing process.

Further, in the manufacturing method of the belt-shaped positive plate 1, respective temperatures Tr(y) of the roll surfaces 241a, 242a, 243a of the cooling rolls 241, 242, 243 have the relationship of Tr(1)>Tr(2)>Tr(3). Accordingly, it is possible to prevent the temperatures of the single-sided positive plate 1y and the double-sided positive plate 1w from suddenly decreasing, and it is possible to easily decrease the temperatures of the single-sided positive plate 1y and the double-sided positive plate 1w stepwise. Accordingly, it is possible to surely prevent wrinkles from being formed in the single-sided positive plate 1y and the double-sided positive plate 1w.

Further, in the manufacturing method of the belt-shaped positive plate 1, by use of radiant heat from the drying furnace 230, the roll surface 241a of the first cooling roll 241 is maintained at the temperature Tr(1)=50° C., and the roll surface 242a of the second cooling roll 242 is maintained at the temperature Tr(1)=35° C. On this account, it is not necessary to separately provide a temperature regulator such as a heater and to use this.

Further, when the temperature differences $\Delta Td(y)$ of the single-sided positive plate 1y and the double-sided positive plate 1w before and after the contact with a y-th cooling roll 241, 242, 243 are too large, more specifically, when the temperature differences $\Delta Td(y)$ are 35° C. or more, wrinkles are easily formed in the single-sided positive plate 1y and the double-sided positive plate 1w. On the other hand, in the manufacturing method of the belt-shaped positive plate 1, the temperature differences $\Delta Td(y)$ of the single-sided positive plate 1y and the double-sided positive plate 1w are less than 35° C. (in the present embodiment, $\Delta Td(1)$=30° C., $\Delta Td(2)$=20° C., Td(3)=15° C.). On this account, it is possible to effectively prevent wrinkles from being formed in the single-sided positive plate 1y and the double-sided positive plate 1w due to rapid cooling along with the contact with the cooling rolls 241, 242, 243.

Further, since the number n of cooling rolls 241, 242, 243 is three or more (n=3, in the present embodiment), it is possible to prevent the temperatures of the single-sided positive plate 1y and the double-sided positive plate 1w from suddenly decreasing and to easily decrease the temperatures of the single-sided positive plate 1y and the double-sided positive plate 1w stepwise, in comparison with a case where the number n of cooling rolls is n=2. Accordingly, it is possible to more surely prevent wrinkles from being formed in the single-sided positive plate 1y and the double-sided positive plate 1w, in comparison with the case where the number n of cooling rolls is n=2.

Further, when the contact lengths L(y), in the longitudinal direction EH, of the cooling rolls 241, 242, 243 and each of the single-sided positive plate 1y and the double-sided positive plate 1w are too short, more specifically, when the contact lengths L(y) are less than 14 mm, the cooling rolls 241, 242, 243 rub against the single-sided positive plate 1y and the double-sided positive plate 1w, so that metal powder or powder of the positive-electrode active material is easily caused. On the other hand, in the manufacturing method of the belt-shaped positive plate 1, each of the contact lengths L(y) is 14 mm or more (in the present embodiment, L(1)=17.5 mm, L(2)=28 mm, and L(3)=73 mm). On this account, it is possible to more effectively restrain metal powder or powder of the active material from being caused due to friction of the cooling roll 241, 242, 243 with the single-sided positive plate 1y and the double-sided positive plate 1w.

Further, since the manufacturing method of the cell 100 includes the positive plate manufacturing step S1 of manufacturing the belt-shaped positive plate 1 by the manufacturing method of the belt-shaped positive plate 1, it is possible to prevent wrinkles from being formed in the single-sided positive plate 1y and the double-sided positive plate 1w conveyed from the drying furnace 230. On this account, by forming the electrode body 120 by use of the belt-shaped positive plate 1 without wrinkles (the electrode body forming step S3), and further, by assembling the cell 100 by use of the electrode body 120 (the cell assembly step S4), a reliable cell 100 can be manufactured.

The disclosure has been described above in line with the embodiment, but the disclosure is not limited to the above embodiment and can be modified and applied appropriately without departing from the gist of the disclosure. For example, in the embodiment, the manufacturing method of the belt-shaped positive plate 1 exemplifies the manufacturing method of the belt-shaped electrode plate, but the disclosure can be applied to the manufacturing method of the belt-shaped negative plate 131.

Further, in the embodiment, the wet first active material layer 5x and the wet second active material layer 6x are formed by applying the positive electrode paste DP to the positive-electrode current collector foil 3, but the formation technique of the wet first active material layer 5x and the wet second active material layer 6x is not limited this. For example, the positive-electrode active material particles, the conductive particles, the binder, and the dispersion medium are mixed and granulated, so that a particle assembly made of clayey wet particles is obtained. Then, the wet first active material layer 5x and the wet second active material layer 6x may be formed on the positive-electrode current collector foil 3 in such a manner that a wet active material layer is formed from the particle assembly and then transferred onto the positive-electrode current collector foil 3 by use of a roll press device with three rolls.

Further, in the cell 100 of the embodiment, the flat wound-type electrode body 120 formed with the belt-shaped positive plate 1 being used while its belt shape is maintained exemplifies the electrode body 120. However, the configuration of the electrode body 120 is not limited to this. For example, the electrode body 120 may be formed as a laminated-type electrode body obtained in such a manner that the belt-shaped positive plate 1 is cut at predetermined intervals in the longitudinal direction EH so as to form a plurality of rectangular positive plates, a plurality of rectangular negative plates and a plurality of rectangular separators are prepared, and the positive plates and the negative plates are laminated alternately via the separators.

What is claimed is:

1. A manufacturing method of a belt-shaped electrode plate including a belt-shaped current collector foil and an active material layer formed on the current collector foil into a belt shape extending in a longitudinal direction of the current collector foil, the manufacturing method comprising:
   forming the active material layer by conveying, in the longitudinal direction, a wet electrode plate in which a wet active material layer is formed on the current collector foil into a belt shape extending in the longitudinal direction, and drying the wet active material layer by heating in a drying furnace; and
   bringing n pieces of cooling rolls into contact with the belt-shaped electrode plate carried out from the drying furnace, so as to cool down the belt-shaped electrode plate by the cooling rolls while the belt-shaped electrode plate is bent in a thickness direction and conveyed in the longitudinal direction by the cooling rolls, wherein:
   n is a natural number of 2 or more; and
   the n pieces of cooling rolls are disposed such that a contact length L(y) is shorter as a temperature difference $\Delta Td(y)$ is larger, where
   (i) L(y) indicates a contact length, in the longitudinal direction, between the belt-shaped electrode plate and a y-th cooling roll configured to make contact with the belt-shaped electrode plate such that the y-th cooling roll is Y-th in an order of making contact with the belt-shaped electrode plate among the n pieces of cooling rolls, and
   (ii) $\Delta Td(1)$ indicates a temperature difference between a temperature Td(0) of the belt-shaped electrode plate at an outlet of the drying furnace and a temperature Td(1) of the belt-shaped electrode plate after the belt-shaped electrode plate has made contact with a first cooling roll, and $\Delta Td(y)$ indicates a temperature difference between a temperature Td(y-1) of the belt-shaped electrode plate after the belt-shaped electrode plate has made contact with a (y-1)th cooling roll and a temperature Td(y) of the belt-shaped electrode plate after the belt-shaped electrode plate has made contact with the y-th cooling roll.

2. The manufacturing method according to claim 1, wherein the n pieces of cooling rolls satisfy a condition of $Tr(1) > \ldots > Tr(n)$, where Tr(y) indicates a temperature of a roll surface of the y-th cooling roll.

3. The manufacturing method according to claim 2, wherein at least one of the n pieces of cooling rolls uses radiant heat from the drying furnace to maintain the temperature Tr(y) of the roll surface.

4. The manufacturing method according to claim 1, wherein the temperature difference $\Delta Td(y)$ is less than 35° C.

5. The manufacturing method according to claim 1, wherein the number n of cooling rolls is three or more.

6. The manufacturing method according to claim 1, wherein the contact length L(y) is 14 mm or more.

7. A manufacturing method of a cell including an electrode body provided with a belt-shaped electrode plate including a belt-shaped current collector foil and an active material layer formed on the current collector foil into a belt shape extending in a longitudinal direction of the current collector foil, the manufacturing method comprising:
   manufacturing the belt-shaped electrode plate by the manufacturing method according to claim 1;
   forming the electrode body including the belt-shaped electrode plate; and
   assembling the cell including the electrode body.

8. An electrode plate manufacturing apparatus for manufacturing a belt-shaped electrode plate including a belt-shaped current collector foil and an active material layer formed on the current collector foil into a belt shape extending in a longitudinal direction of the current collector foil, the electrode plate manufacturing apparatus comprising:
   a drying furnace configured to form the active material layer by conveying, in the longitudinal direction, a wet electrode plate in which a wet active material layer is formed on the current collector foil into a belt shape extending in the longitudinal direction, and drying the wet active material layer by heating; and
   n pieces of cooling rolls configured to cool down the belt-shaped electrode plate by making contact with the belt-shaped electrode plate carried out from the drying furnace and conveying the belt-shaped electrode plate in the longitudinal direction while the belt-shaped electrode plate is bent in a thickness direction, wherein:
   n is a natural number of 2 or more; and
   the n pieces of cooling rolls are disposed such that a contact length L(y) is shorter as a temperature difference $\Delta Td(y)$ is larger, where
   L(y) indicates a contact length, in the longitudinal direction, between the belt-shaped electrode plate and a y-th cooling roll configured to make contact with the belt-shaped electrode plate such that the y-th cooling roll is Y-th in an order of making contact with the belt-shaped electrode plate among the n pieces of cooling rolls, and
   $\Delta Td(1)$ indicates a temperature difference between a temperature Td(0) of the belt-shaped electrode plate at an outlet of the drying furnace and a temperature Td(1) of the belt-shaped electrode plate after the belt-shaped electrode plate has made contact with a first cooling roll, and $\Delta Td(y)$ indicates a temperature difference between a temperature Td(y-1) of the belt-shaped electrode plate after the belt-shaped electrode plate has made contact with a (y−1)th cooling roll and a temperature Td(y) of the belt-shaped electrode plate after the belt-shaped electrode plate has made contact with the y-th cooling roll.

9. The electrode plate manufacturing apparatus according to claim 8, wherein the n pieces of cooling rolls satisfy a condition of Tr(1)> . . . >Tr(n), where Tr(y) indicates a temperature of a roll surface of the y-th cooling roll.

10. The electrode plate manufacturing apparatus according to claim 9, wherein at least one of the n pieces of cooling rolls is disposed at a position where the at least one of the n pieces of cooling roll receives radiant heat from the drying furnace to maintain the temperature Tr(y) of the roll surface.

11. The electrode plate manufacturing apparatus according to claim 8, wherein the temperature difference ΔTd(y) is less than 35° C.

12. The electrode plate manufacturing apparatus according to claim 8, wherein the number n of cooling rolls is three or more.

13. The electrode plate manufacturing apparatus according to claim 8, wherein the contact length L(y) is 14 mm or more.

14. The electrode plate manufacturing apparatus according to claim 8, wherein the contact length L(y) is shorter on a side closer to the drying furnace in a conveying direction of the belt-shaped electrode plate.

* * * * *